US006522329B1

(12) United States Patent
Ihara et al.

(10) Patent No.: US 6,522,329 B1
(45) Date of Patent: Feb. 18, 2003

(54) IMAGE PROCESSING DEVICE AND METHOD FOR PRODUCING ANIMATED IMAGE DATA

(75) Inventors: Yushi Ihara, Kanagawa (JP); Yuji Matsumoto, Kanagawa (JP); Eiichi Ishii, Tokyo (JP); Chizuru Makita, Kanagawa (JP); Kohei Nojiri, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/269,896

(22) PCT Filed: Aug. 4, 1998

(86) PCT No.: PCT/JP98/03477
§ 371 (c)(1),
(2), (4) Date: Nov. 12, 1999

(87) PCT Pub. No.: WO99/06955
PCT Pub. Date: Feb. 11, 1999

(30) Foreign Application Priority Data

Aug. 4, 1997 (JP) .............................................. 9-223163

(51) Int. Cl.⁷ .............................................. G06T 13/00
(52) U.S. Cl. ........................ 345/441; 345/473; 345/594
(58) Field of Search ................................ 345/441, 442, 345/593, 469.1, 473, 594; 382/258, 259; 399/81, 183, 184, 157; 358/453, 538; 352/50, 52; 348/576, 577

(56) References Cited

U.S. PATENT DOCUMENTS

| 4,189,743 A | * | 2/1980 | Schure et al. |
| 4,189,744 A | * | 2/1980 | Stern |
| 4,952,051 A | * | 8/1990 | Lovell et al. |
| 5,042,941 A | * | 8/1991 | D'Ocon Guerrero |
| 5,384,866 A | * | 1/1995 | Kumagai |
| 5,966,134 A | * | 10/1999 | Arias |
| 6,173,075 B1 | * | 1/2001 | Collins |

FOREIGN PATENT DOCUMENTS

| GB | 2 205 704 A | * | 12/1988 |
| JP | 4-51371 A | * | 2/1992 |
| JP | 4-362787 A | * | 12/1992 |
| JP | 5-197366 | | 8/1993 |
| JP | 8-16758 A | * | 1/1996 |
| JP | 8-30780 A | * | 2/1996 |
| JP | 5-180175 | | 7/1996 |

OTHER PUBLICATIONS

Bruce Wallace, Merging and Transformation of Raster Images for Cartoon Animation, Aug. 1981, ACM Special Interest Group on Computer Graphics and Interactive Techniques, vol. 15, No.3, pp. 253–262.*

Painter 3 User Guide, Fractal Design Corporation, 1994, pp. 236–257.

* cited by examiner

Primary Examiner—Jeffery Brier
(74) Attorney, Agent, or Firm—Frommer Lawrence & Haug LLP; William S. Frommer; Darren M. Simon

(57) ABSTRACT

A trace line picture which is manually drawn with a pen is taken in by a camera or a scanner, and is supplied to a personal computer as an original line drawing. The personal computer carries out thinning processing on the supplied line drawing, and paints all pixels in a closed area surrounded by the thinned line with a color designated by an operator. Then, the computer thickens the original trace line and colors pixels on the thickened trace line with a predetermined color, in accordance with a command from the operator. The computer synthesizes the picture of the closed area surrounded by the thinned line and the thickened picture in accordance with a predetermined synthesis formula. Finally, the computer checks whether or not pictures synthesized over several frames are displayed as an appropriate dynamic image. By the above-described production processing, an animation color image can be quickly produced by using the computer.

17 Claims, 31 Drawing Sheets

FIG.10

| PALETTE NUMBER | NAME OF COLOR | RGB 24-BIT DATA |
|---|---|---|
| 0 | BLACK | 111111111····111111 |
| 1 | BLUE | 0000·····0011111111 |
| 2 | RED | 11111111000······000 |
| 3 | MAGENTA | 00000······01001011 |
| 4 | GREEN | 00··001111111100··00 |
| 5 | CYAN | 001011000···10000101 |
| 6 | YELLOW | 000010······ 0010111 |
| 7 | WHITE | 0000000······0000000 |

| PALETTE NUMBER | RGB 24-BIT DATA | NAME |
|---|---|---|
| 0 | 111111111···111111 | BLACK |
| 1 | 0000····0011111111 | BLUE |
| 2 | 11111111000······000 | RED |
| 3 | 00000······01001011 | MAGENTA |
| 4 | 00··001111111100··00 | GREEN |
| 5 | 001011000···10000101 | CYAN |
| 6 | 000010······0010111 | YELLOW |
| 7 | 0000000······0000000 | WHITE |
| 8 | 111010110···00011011 | CLOTHES 1 |
| 9 | 001111000···01101100 | CLOTHES 2 |
| 10 | 001011000···10000101 | SKIN 1 |
| 11 | 001011000···10000101 | WALL 1 |
| ⋮ | ⋮ | ⋮ |
| 207 | 001011111···00001101 | SKY 5 |
| 208 |  | LATTICE 1 |
| ⋮ | ⋮ | ⋮ |
| 255 |  | LATTICE 10 |

Palette numbers 8 through 207: USER AREA

FIG.23

| PALETTE NUMBER | COLOR | RGB 24-BIT DATA |
|---|---|---|
| 0 | BLUE | 0000·····0011111111 |
| 255 | WHITE | 0000000······0000000 |

FIG.24

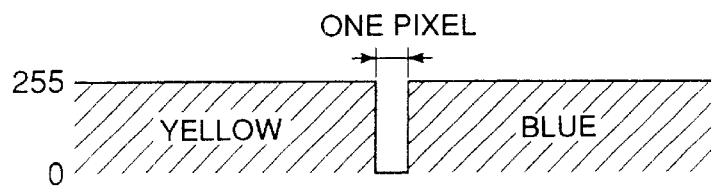
FIG.31A
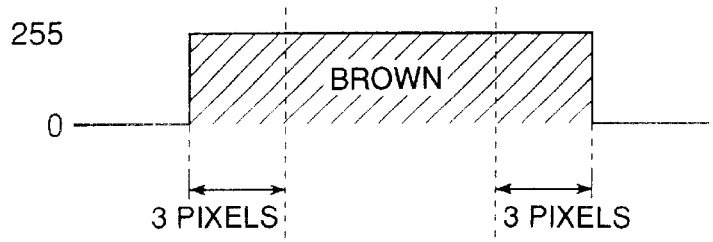
FIG.31B

FIG.31D
FIG.31E

IMAGE PROCESSING DEVICE AND METHOD FOR PRODUCING ANIMATED IMAGE DATA

Technical Field

This invention relates to image data processing device and method and a transmission medium, and particularly to image data processing device and method and a transmission medium which enable quick generation of image data of animation by using a computer.

BACKGROUND ART

FIG. 36 shows the flow of processing in producing a conventional animation. First, at step S1, planning of production of an animation is carried out. On the basis of this planning, a scenario is prepared at step S2. Next, at step S3, original pictures are prepared. The original pictures are drawn on paper with a pencil or a pen.

At step S4, a dynamic image is prepared on the basis of the original pictures prepared at step S3. The dynamic image is prepared by interpolating one original picture and the next original picture prepared at step S3 so as to appear as a dynamic image.

At step S5, the dynamic image thus prepared is copied on a transparent film, thus preparing cell pictures. At this point, an image of one frame is constituted by images of a plurality of layers.

For example, a dynamic image made of three frames, showing a person and a dog walking together to a house, is constituted by three layers for each frame, as shown in FIG. 37. Specifically, in this example, a cell picture C in which the house is drawn is prepared as a background layer. The person and the dog are drawn in a layer A and a layer B, respectively. In the layer A, the person in a cell picture A2 of a frame F2 is drawn at a position slightly shifted from the position in a cell picture A1 of a frame F1. Similarly, the person in a cell picture A3 of a frame F3 is drawn at a position slightly shifted from the position in the cell picture A2 of the frame F2.

Also, in the layer B, the position of the dog in a cell picture B2 of the frame F2 is slightly shifted from the position in a cell picture B1 of the frame F1. The position of the dog in a cell picture B3 of the frame Frame 3 is slightly shifted from the position in the cell picture B2 of the frame F2.

Thus, as the cell pictures of the plural layers are prepared, painting processing (coloring processing) on these cell pictures is carried out at step S6. That is, coloring processing on each cell picture is carried out by using paints. Next, at step S7, a plurality of colored cell pictures are superposed on one another and filmed, thus forming one frame.

For example, as shown in FIG. 38, one frame of image is formed by superposing the layer A and the layer B on the layer C. Such processing is sequentially carried out on a plurality of frames so as to produce dynamic image data of a plurality of frames.

At step S8, the dynamic image thus prepared is reproduced and checked. After that, at step S9, sound signals corresponding to the dynamic image are recorded. The ultimately produced film is telecast at step S10.

In this manner, in the case where cell pictures are colored by manual operation, it is troublesome and time-consuming to produce animation images. Thus, it has been considered to computerize the foregoing operation. In this case, an already colored picture and an uncolored picture can be confirmed by preparing a key data and displaying a picture corresponding to the α key data.

In such conventional animation producing technique, preparation of a dynamic image, preparation of cell pictures, painting processing, filing processing and the like are carried out manually. Therefore, it is troublesome and time-consuming to produce one animation film.

Also, in the conventional animation producing technique, when the manual operation for superposing a plurality of cell pictures for each layer and filming the superposed pictures is repeated to produce a dynamic image made of a plurality of frames, it is difficult to change frame pictures.

Moreover, in the conventional animation producing technique, when cell pictures are manually colored and filmed, it is troublesome and time-consuming to produce one animation film. As a result, it is difficult to change an already prepared picture to a picture full of variety.

On the other hand, it has been proposed to computerize coloring processing, unlike the foregoing manual animation producing technique. However, when coloring processing is carried out by using a computer, it is difficult for the writer to express fine touches as in manual drawing with a pencil or a pen. Particularly, in the case of animation pictures, fine touches expressed by manual drawing are desired but it is difficult to express such fine touches by a computer.

SUMMARY OF THE INVENTION

It is an object of the present invention to provide a device which enables quick and easy production of animation pictures. It is another object of the present invention to provide a device which enables generation of animation image data of a tough intended by the writer. It is still another object of the present invention to improve the operability in preparing animation pictures.

According to the present invention, there is provided an image data processing device including: line drawing generation means for generating a picture constituted by a line from a picture taken therein; area coloring means for coloring pixels of an area surrounded by the line constituting the picture; and synthesis means for synthesizing the picture obtained by coloring the pixels of the area by the area coloring means and the picture constituted by the line.

It is preferred that the image data processing device according to the present invention further includes line coloring means for coloring pixels of the line constituting the picture.

Also, it is preferred that the image data processing device according to the present invention further includes intake means for taking in a picture for generating the picture constituted by the line.

In the image data processing device, an image data processing method which realizes the same features and a transmission medium, a line drawing is generated from a picture taken therein, and a colored picture and a line drawing picture are synthesized.

According to the present invention, there is also provided an image data processing device including: cell number designation means for designating the cell number of a cell picture to be taken therein; layer number designation means for designating the layer number of the cell picture to be taken therein; and display control means for displaying the cell number and the layer number of a cell picture which is already taken therein.

It is preferred that the image data processing device according to the present invention further includes cell picture display control means for displaying the cell picture taken therein.

In such image data processing device, an image data processing method which realizes the same features and a transmission medium, the cell number and the layer number of a cell picture to be taken therein are designated, and the cell number and the layer number of a cell picture which is already taken therein are displayed.

According to the present invention, there is also provided an image data processing device including: time sheet display control means for displaying a time sheet prescribed by frame numbers corresponding to time series of frames of a dynamic image and layer numbers; and cell number input means for inputting the cell number of a cell picture taken therein, at a predetermined position on the time sheet.

It is preferred that the image data processing device further includes registration means for registering, for each layer, the cell picture taken therein onto an entry list, and that the cell number input means inputs the cell number registered on the entry list.

Also, it is preferred that the image data processing device further includes registered picture display control means for displaying the cell picture registered on the entry list, for each layer in the order of cell number.

In addition, it is preferred that the image data processing device further includes special effect setting means for setting a special effect for each layer, cell or frame.

It is also preferred that the image data processing device further includes synthesis means for synthesizing, for each frame, the cell picture of each layer number inputted on the time sheet.

It is also preferred that the image data processing device further includes dynamic image display control means for tentatively displaying the picture synthesized by the synthesis means, as a dynamic image.

In such image data processing device, an image data processing method which realizes the same features and a transmission medium, a time sheet prescribed by the frame numbers and the layer numbers is displayed, and the cell number of the cell picture taken therein is inputted at a predetermined position on the time sheet. Thus, it is possible to constitute and change each frame of picture easily and securely.

According to the present invention, there is also provided an image data processing device including: detection means for detecting the density of a trace line constituting a picture taken therein; area coloring means for coloring an area surrounded by the trace line; and determination means for determining the color in the vicinity of the trace line surrounded by the trace line in accordance with the density of the trace line.

It is preferred that the image data processing device according to the present invention further includes line coloring means for coloring the trace line, and that the determination means gradates the color of a boundary portion between the trace line and the area surrounded by the trace line by using the color of the trace line and the color of the area surrounded by the trace line in accordance with the density of the trace line.

It is also preferred that the image data processing device according to the present invention further includes identification means for identifying the original color of the trace line, and that the determination means determines the color in accordance with the result of identification of the identification means.

The image data processing device according to the present invention further includes thickening means for thickening the trace line by predetermined pixels.

In the image data processing device having such features, an image data processing method having the same features and a transmission medium, the density of a trace line is detected, and the color in the vicinity of the trace line of an area surrounded by the trace line is determined in accordance with the density.

According to the present invention, there is provided an image data processing device including: identification means for identifying the original color of a trace line constituting a picture taken therein; area coloring means for coloring the area surrounded by the trace line; and determination means for determining the color of a boundary portion between the trace line and the area surrounded by the trace line or the color of a boundary portion between an area on one side and an area on the other side of the trace line in the case where the trace line is omitted, in accordance with the result of identification by the identification means.

In the image data processing device having such features, an image data processing method having the same features and a transmission medium, the color of a boundary portion between the trace line and the area surrounded by the trace line or the color of a boundary portion between an area on one side and an area on the other side of the trace line in the case where the trace line is omitted, is determined in accordance with the result of identification of the original color of the trace line.

According to the present invention, there is also provided an image data processing device including: binary expression means for expressing respective pixels of a trace line taken therein in a binary form of colored pixels and colorless pixels; and conversion means for converting the trace line to a line consisting of colored pixels having a width of one pixel.

It is preferred that the image data processing device according to the present invention further includes coloring means for coloring a colorless pixel of an area surrounded by the line of the width of one pixel with a predetermined color.

In the image data processing device having such features, an image data processing method having the same features and a transmission medium, a trace line taken therein is expressed in a binary form and then converted to a line consisting of colored pixels having a width of one pixel.

According to the present invention, there is also provided an image data processing device including: binary expression means for expressing respective pixels of a trace line taken therein in a binary form of colored pixels and colorless pixels; and confirmation means for confirming whether a trace line consisting of colored pixels expressed in the binary form by the binary expression means is closed or not.

It is preferred that the image data processing device according to the present invention further includes conversion means for converting the trace line consisting of colored pixels to a trace line having a width of one pixel, and that the confirmation means confirms that the trace line having the width of one pixel is closed.

It is also preferred that the image data processing device according to the present invention further includes correction means for correcting an open part so as to form a closed area, when the confirmation means has confirmed that a part of the trace line is opened.

In the image data processing device having such features, an image data processing method having the same features and a transmission medium, pixels of a trace line taken therein are expressed in a binary form of colored pixels and colorless pixels, and it is confirmed whether a trace line consisting of colored pixels expressed in the binary form is closed or not.

According to the present invention, there is also provided an image data processing device including: colored picture generation means for generating a colored picture obtained by coloring a predetermined area of a line drawing; identification picture generation means for generating an identification picture for identifying a colored area and an uncolored picture of the colored picture; and display control means for displaying the colored picture on the identification picture.

It is preferred that the image data processing device according to the present invention further includes extraction means for extracting the color of a predetermined area of the colored picture displayed on the identification picture, and coloring means for coloring the uncolored area of the colored picture with the color extracted by the extraction means.

In the image data processing device having such features, an image data processing method having the same features and a transmission medium, a colored picture is displayed on an identification picture for identifying a colored area and an uncolored area of the colored picture.

According to the present invention, there is also provided an image data processing device including: discrimination means for discriminating the corresponding relation between a first picture of a first frame and a second picture of a second frame; detection means for detecting the color of the first picture; and coloring means for coloring the second picture with the color detected by the detection means in accordance with the result of discrimination by the discrimination means.

It is preferred that the image data processing device according to the present invention further includes selection means for selecting coloring of only a designated area or coloring of all of plural corresponding areas.

In the image data processing device having such features, an image data processing method having the same features and a transmission medium, the corresponding relation between a first picture of a first frame and a second picture of a second frame is discriminated, and the color of the first picture is detected. Then, in accordance with the result of discrimination, the second picture is colored with the detected color.

According to the present invention, there is further provided an image data processing device including: colored picture generation means for coloring, with a predetermined color, uncolored pixels of an area surrounded by a trace line of a cell picture taken therein, thus generating a colored picture; key data generation means for generating key data for identifying a colored area and an uncolored area of the colored picture in accordance with coloring processing by the colored picture generation means; parameter setting means for setting a parameter prescribing the priority in synthesizing colored pictures of a plurality of layers; and synthesis means for synthesizing colored pictures of a plurality of layers in accordance with the parameter set by the parameter setting means and the key data generated by the key data generation means.

In the image data processing device having such features, an image data processing method having the same features and a transmission medium, colored pictures of a plurality of layers are synthesized in accordance with a parameter and key data.

BRIEF DESCRIPTION OF THE DRAWINGS

FIG. 10 shows a trace line which is taken in the device.

FIG. 23 shows an exemplary lookup table for paint data.

FIG. 24 shows an exemplary fixed palette of alpha key data.

FIGS. 31A to 31F are views for explaining synthesis processing.

BEST MODE FOR CARRYING OUT THE INVENTION

Preferred embodiments of the present invention will now be described with reference to the drawings.

Figure 1:
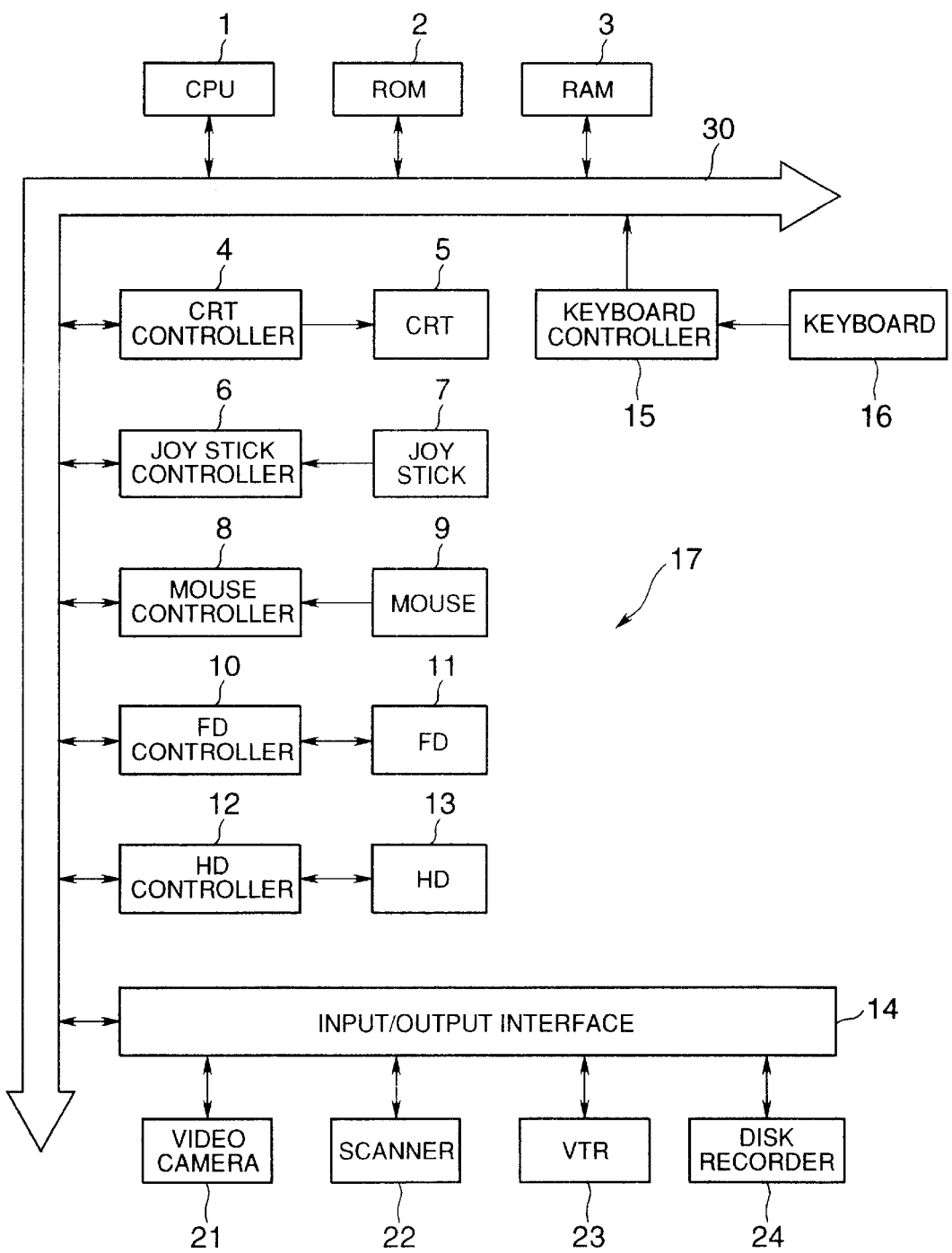
FIG. 1 is a block diagram showing an exemplary structure of a personal computer to which the present invention is applied.

FIG. 1 shows an exemplary structure of a personal computer to which the present invention is applied. In the example, a personal computer 17 has a CPU 1 for executing various processing. In a ROM 2, a program necessary for the CPU 1 to execute various processing is stored. In a RAM 3, data and a program necessary for the CPU 1 to execute various processing are suitably stored.

A CRT controller 4 is controlled by the CPU 1 and causes a CRT 5 to display a predetermined picture. When the user operates a joy stick 7, a joy stick controller 6 outputs its operation signal to the CPU 1. When the user operates a mouse 9, a mouse controller 8 outputs its operation signal to the CPU 1.

A floppy disk (FD) controller 10 carries out processing for recording or reproducing data to or from a floppy disk 11. Similarly, a hard disk (HD) controller 12 carries out processing for recording or reproducing data to or from a hard disk 13. A keyboard controller 15 outputs an input from a keyboard 16 to the CPU 1.

To this personal computer 17, a video camera 21, a scanner 22, a video tape recorder 23 and a disk recorder 24 are connected through an input/output interface 14.

In the personal computer 17 shown in FIG. 1, the CPU 1, ROM 2, RAM 3 and various controllers 4, 6, 8, 10, 12 are connected to a system bus 30.

Figure 2:
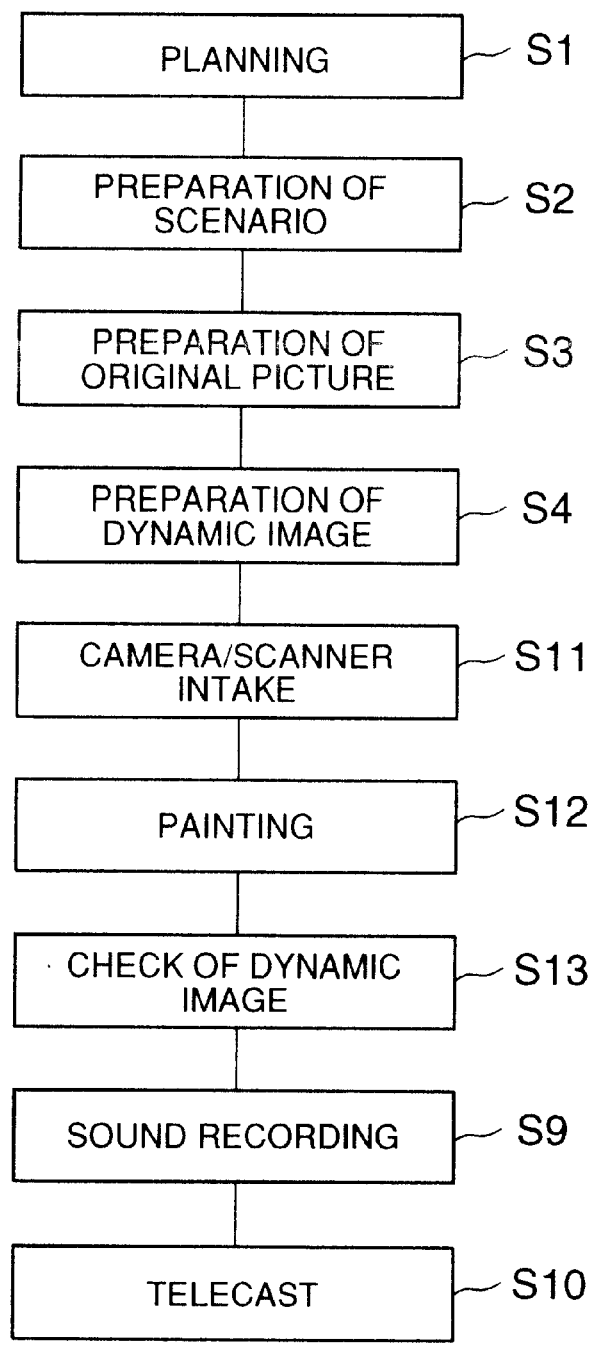
FIG. 2 shows the flow of animation production according to the present invention.
Figure 36:
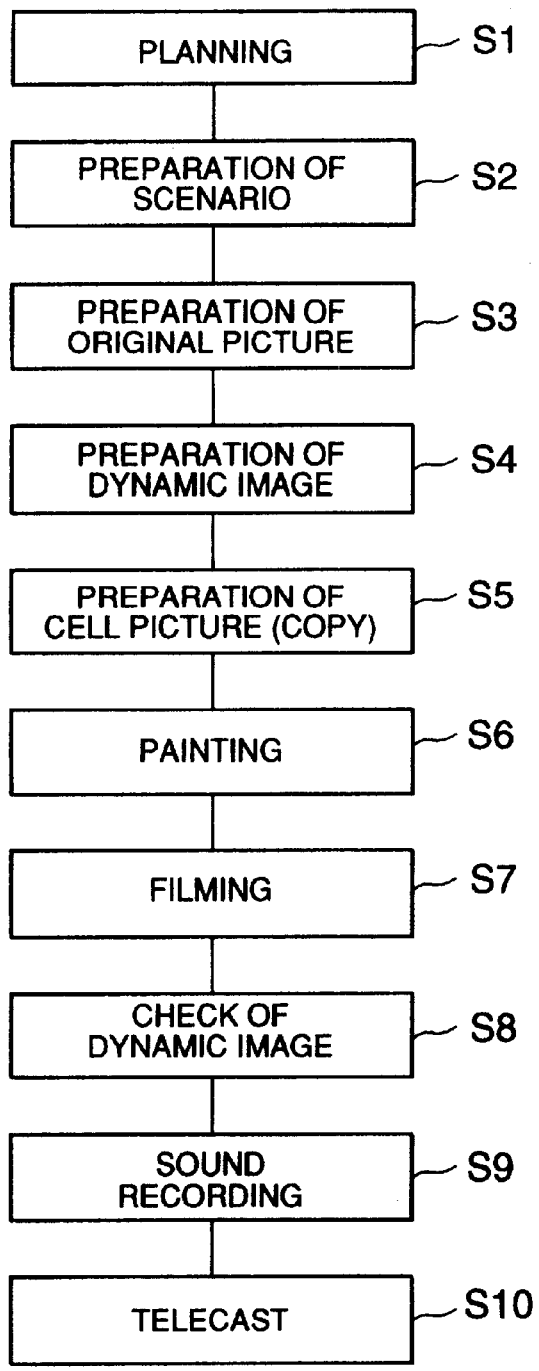
FIG. 36 shows the flow of conventional animation production.
Figure 37:
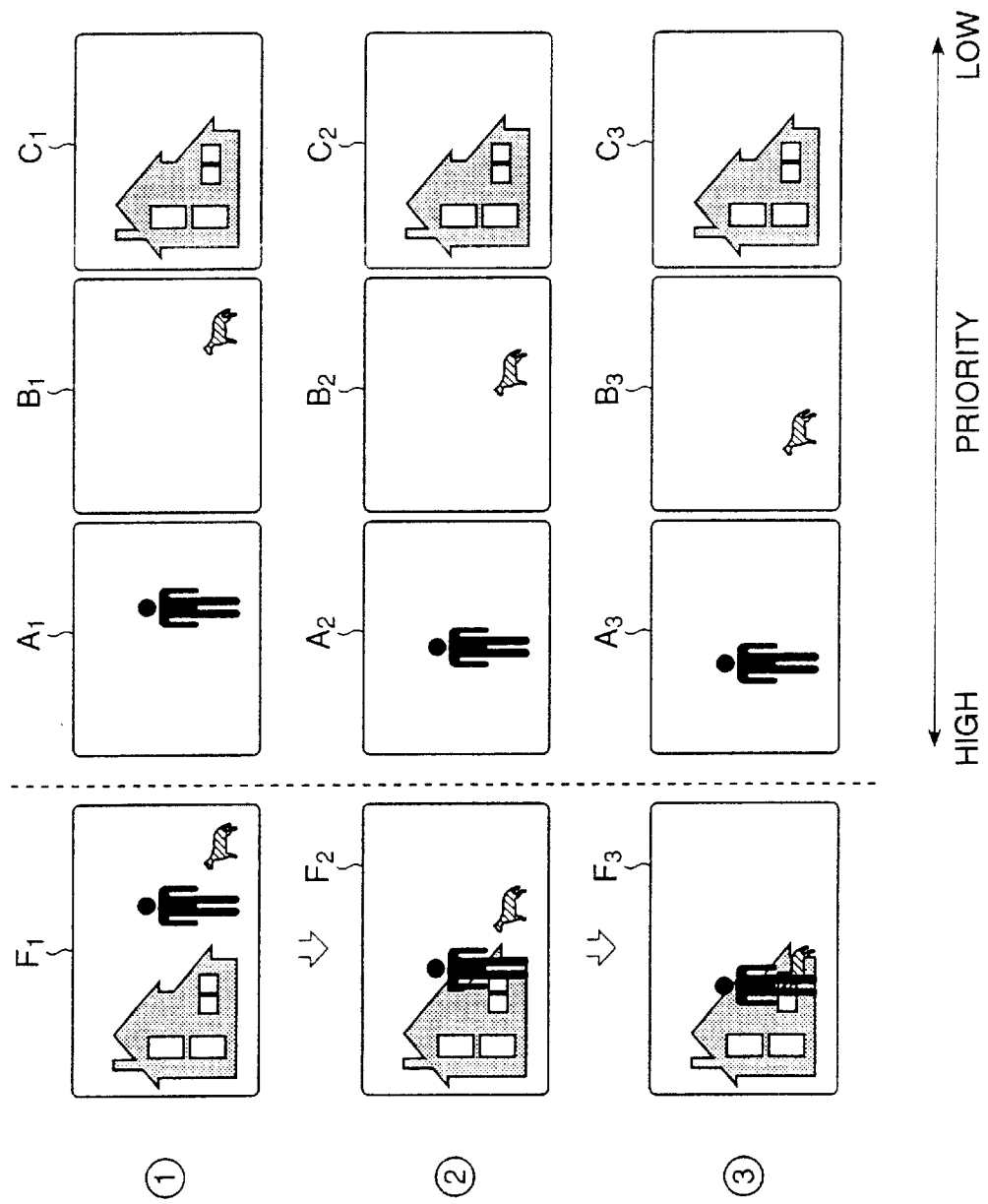
FIG. 37 is a view for explaining the structure of a frame.
Figure 38:
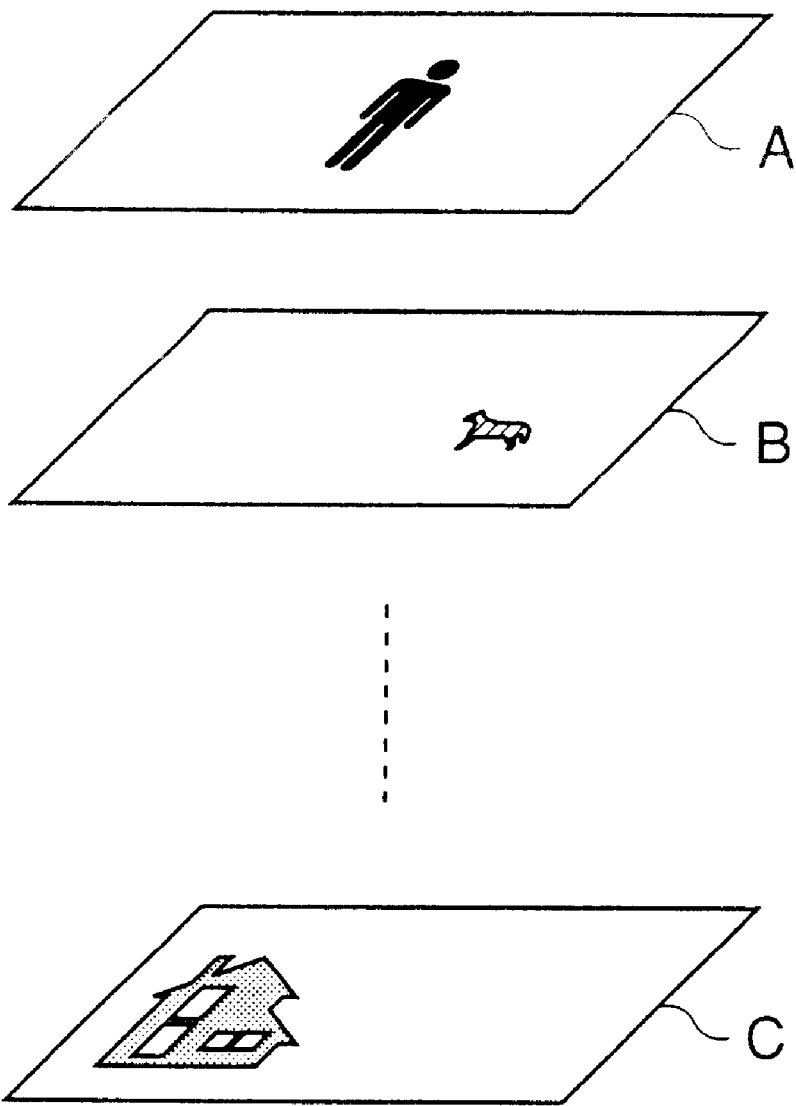
FIG. 38 is a view for explaining synthesis of layers.

FIG. 2 shows the flow of animation production according to the present invention, and processing corresponding to processing of FIG. 36 is denoted by the same numeral. Specifically, in the present invention, too, processing from planning at step S1 to preparation of a dynamic image at step S4 and processing of sound recording at step S9 and telecast at step S10 are carried out similarly to the case of FIG. 36.

In this embodiment of the present invention, processing from steps S11 to S13, which is carried out after preparation of a dynamic image is carried out at step S4 and before sound recording is carried out at step S9, differs from the processing of the conventional case. This entire processing is carried out on the computer.

At step S11, the dynamic image prepared at step S4 is taken in by the video camera 21 or the scanner 22. Then, at step S12, painting processing is carried out on the image taken in at step S11. This painting processing is carried out on the computer, not by manual operation using paints. The image on which painting has been completed is reproduced along a time sheet and checked at step S13. After check of the dynamic image is carried out at step S13, sound recording is carried out at step S9 and the ultimately produced film is telecast at step S10.

Figure 3:
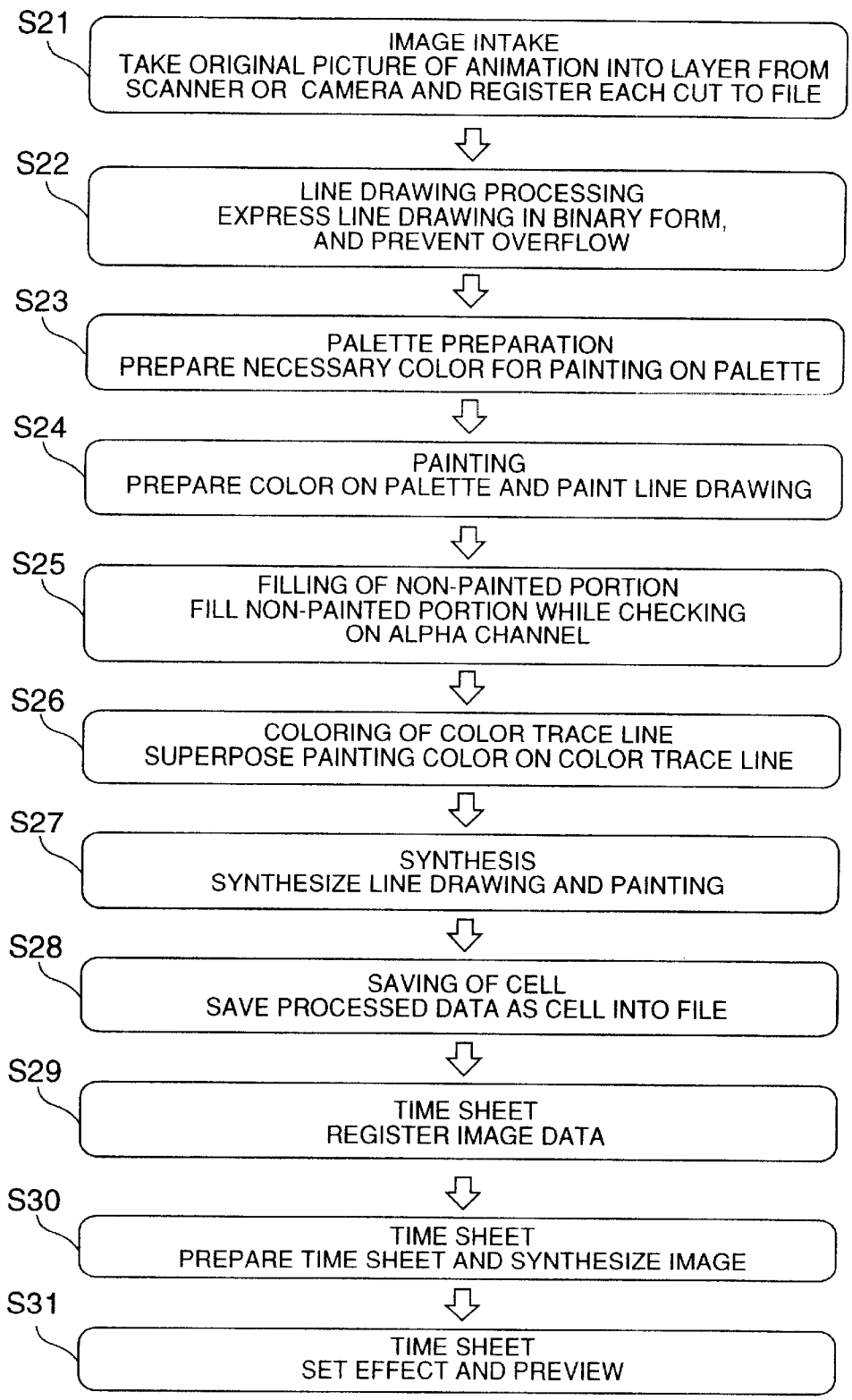
FIG. 3 a flowchart for explaining detailed processing of steps S11 to S13 of FIG. 2.

FIG. 3 shows detailed processing of steps S11 to S13 of FIG. 2. First, at step S21, the prepared dynamic image is taken in by using the scanner 22 or the video camera 21. This intake processing is carried out for each layer or cut of the dynamic image, and each layer or cut is registered on the file.

At step S22, line drawing processing of the image taken in at step S21 is carried out. By thin line drawing processing, the image taken in is expressed in a binary form for painting. At this point, as will be later described in detail, the line drawing is thinned so that its trace line is expressed with a width of one pixel. Then, it is checked whether or not a closed area is formed by a line having the width of one pixel. Painting processing at step S24, as will be later described, is carried out with respect to this closed area as a unit.

Next, the processing goes to step S23, where a necessary color for painting is prepared on a palette. At step S24, the line drawing is colored by using the palette. When one area closed by the line having the width of one pixel is designated and then a color for coloring the area is designated, pixels within the area are automatically colored with the designated color.

At step S25, it is checked whether or not an uncolored area exists from among the respective areas. If an uncolored area exists (i.e., if a non-painted area exists), processing for coloring that area is carried out.

At step S26, a predetermined color is put on a trace line of an original color. The color of the original trace line forms a kind of command, as will be later described, and is not necessarily coincident with the color to be displayed as an animation picture. In this example, the trace line is colored with the color to be displayed as an animation picture.

At step S27, the picture obtained as a result of painting processing at step S24 and the picture of the trace line obtained by coloring processing at step S26 are synthesized. The picture thus synthesized is saved as a file based on each cell picture as a unit, at step S28.

In this manner, when a plurality of cell pictures are saved, time sheet processing is carried out at steps S29 to S31. In this time sheet processing, first, the saved cell pictures are registered on an entry list. After registration on the entry list, the cell pictures are arranged on the time sheet by using the cell numbers on the entry list. Thus, each frame of picture can be prescribed by pictures of a desired number of layers. Also, in this time sheet processing, special effects can be set if necessary.

The frames thus prescribed on the time sheet can be previewed as a dynamic image (i.e., tentatively displayed as a dynamic image) and confirmed.

Figure 4:
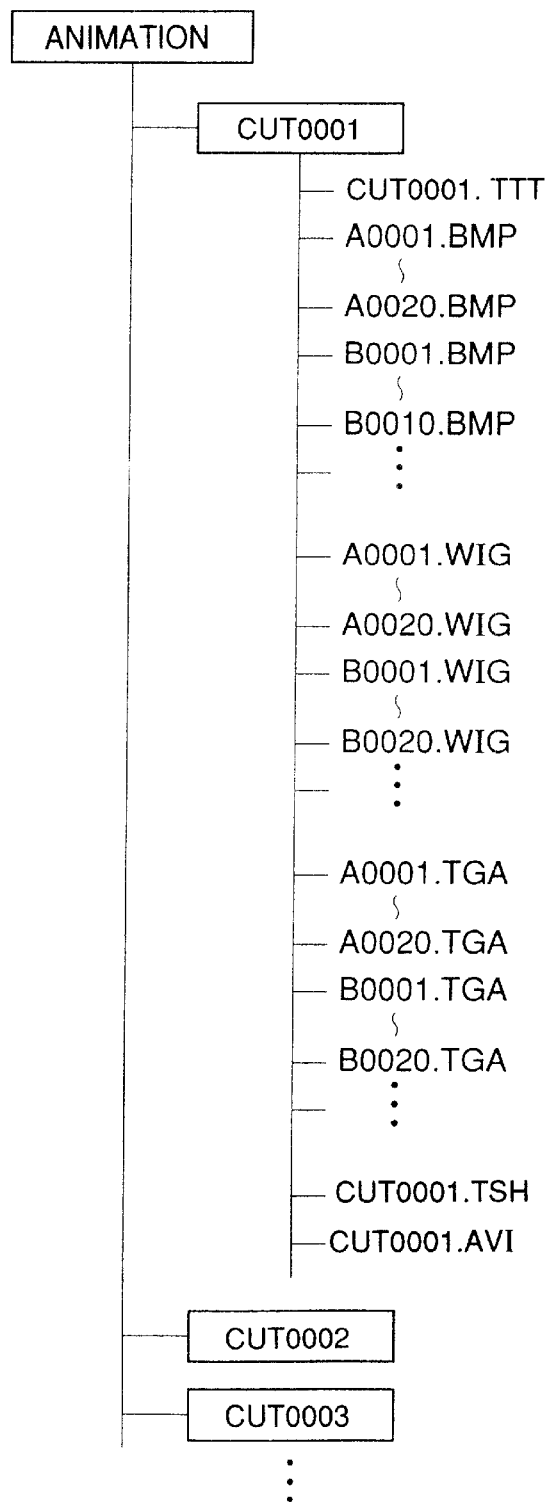
FIG. 4 shows the structure of a file.

The structure of the file generated by carrying out the foregoing processing will now be described with reference to FIG. 4. Animation data is constituted by data of a plurality of cuts. A cut mentioned here means a group of continuous pictures. Each cut has a management file expressed by appending an extension of ".TTT" to the cut name and cut number, a bit map file expressed by appending an extension of ".BMP" to the layer and cell numbers, and a work file suitably prepared in the process and expressed by appending an extension of ".WIG" to the layer and cell numbers. In addition, each cut has a TARGA file expressed by appending an extension of ".TGA" to the layer and cell numbers, a time shift file expressed by appending an extension of ".TSH" to the cut name and cut number, and an animation file expressed by appending an extension of ".AVI" to the cut name and cut number.

The management file having the extension of ".TTT" includes number of list data, file name list data, and color palette data. The file name list data has an extension of ".BMP", and if the number thereof is n, the number of list data is n.

The color palette file is expressed by appending an extension of ".PAL" to the layer and cell numbers. In this color palette, color components and names of colors up to 256 colors are saved.

The work file having the extension of ".WIG" has picture width and height information representing the contents of a special effect, 24-bit original information as a picture obtained by correcting a scanner image, an 8-bit line drawing picture as a picture identified as a line drawing, an 8-bit painted picture as a colored picture, an 8-bit alpha picture for discriminating a colored portion, an 8-bit trace picture as a picture obtained by coloring a trace line, and a 24-bit final picture as a synthesized picture.

The TARGA file expressed by the extension of ".TGA" includes 32-bit data constituted by 24-bit final image data and 8-bit final key data.

The time sheet file expressed by the extension of ".TSH" includes the number of registered pictures, the number of frames, the maximum number of layers, resolution of rendering, name of registered picture list, and time sheet data. The time sheet data is data indicating which layer should be superposed at which time. The background picture is assumed as a picture of one layer.

Figure 5:
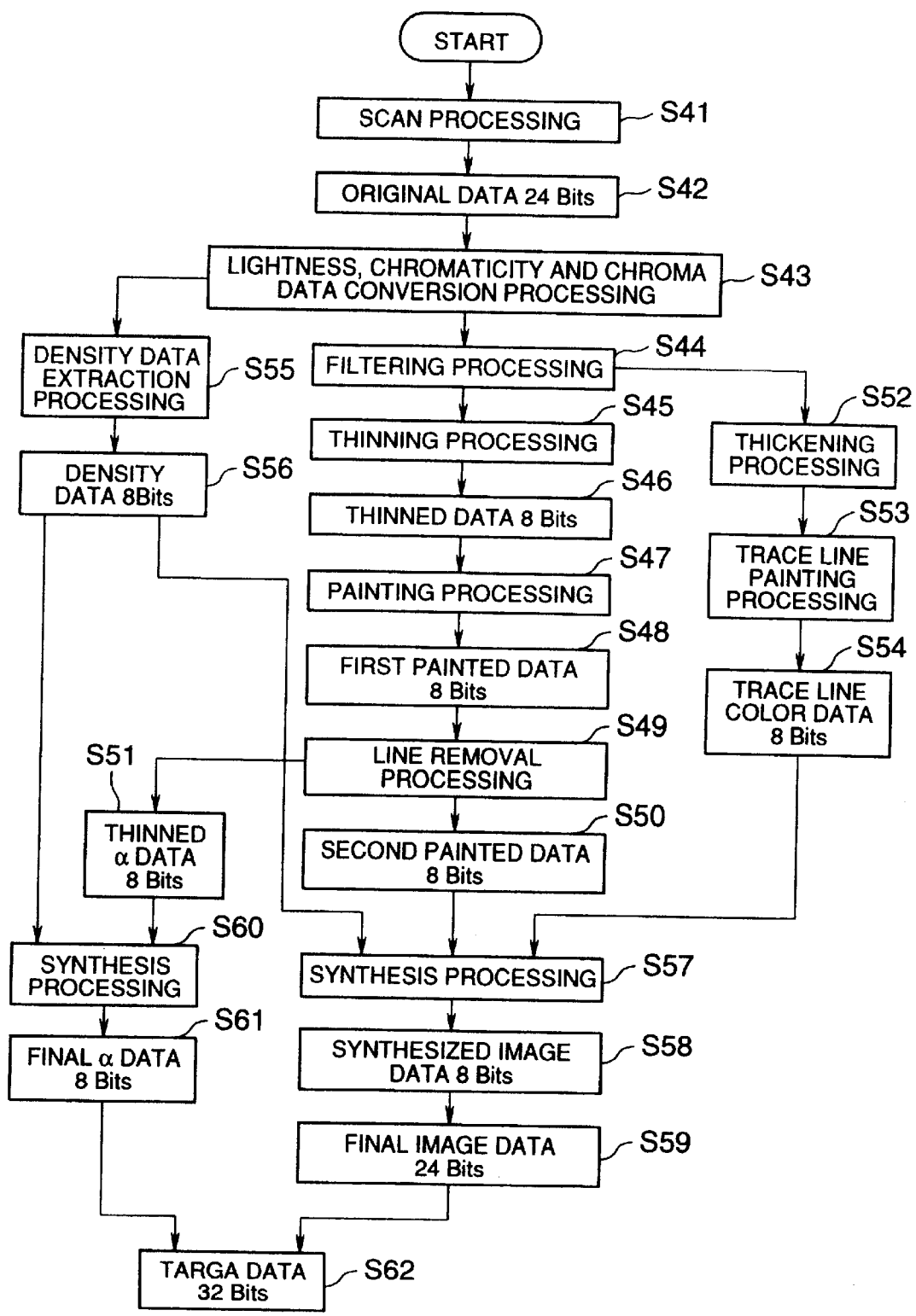
FIG. 5 is a flowchart for explaining generation of data.
Figure 6:
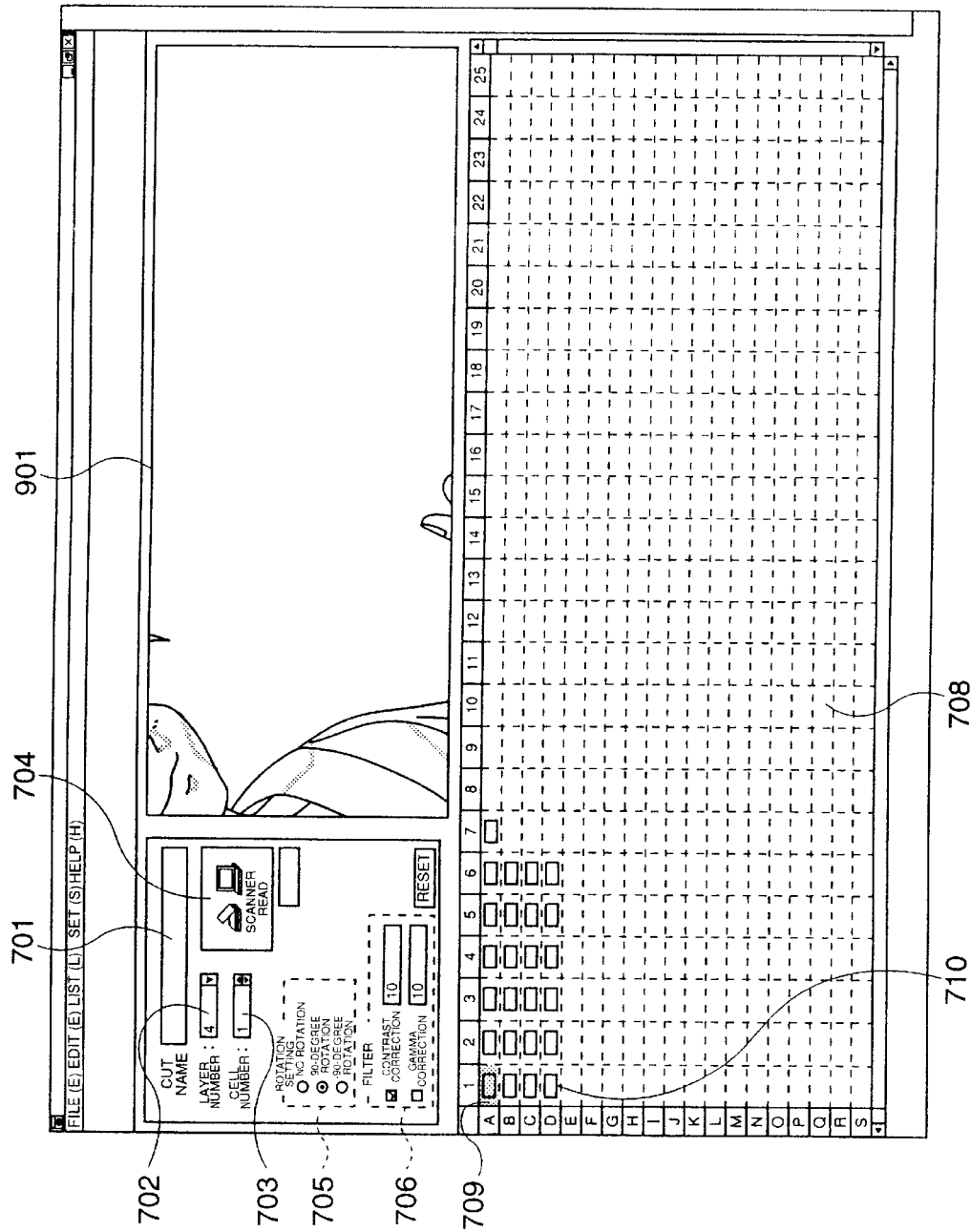
FIG. 6 shows an exemplary GUI (graphical user interface) for scan processing.
Figure 7:
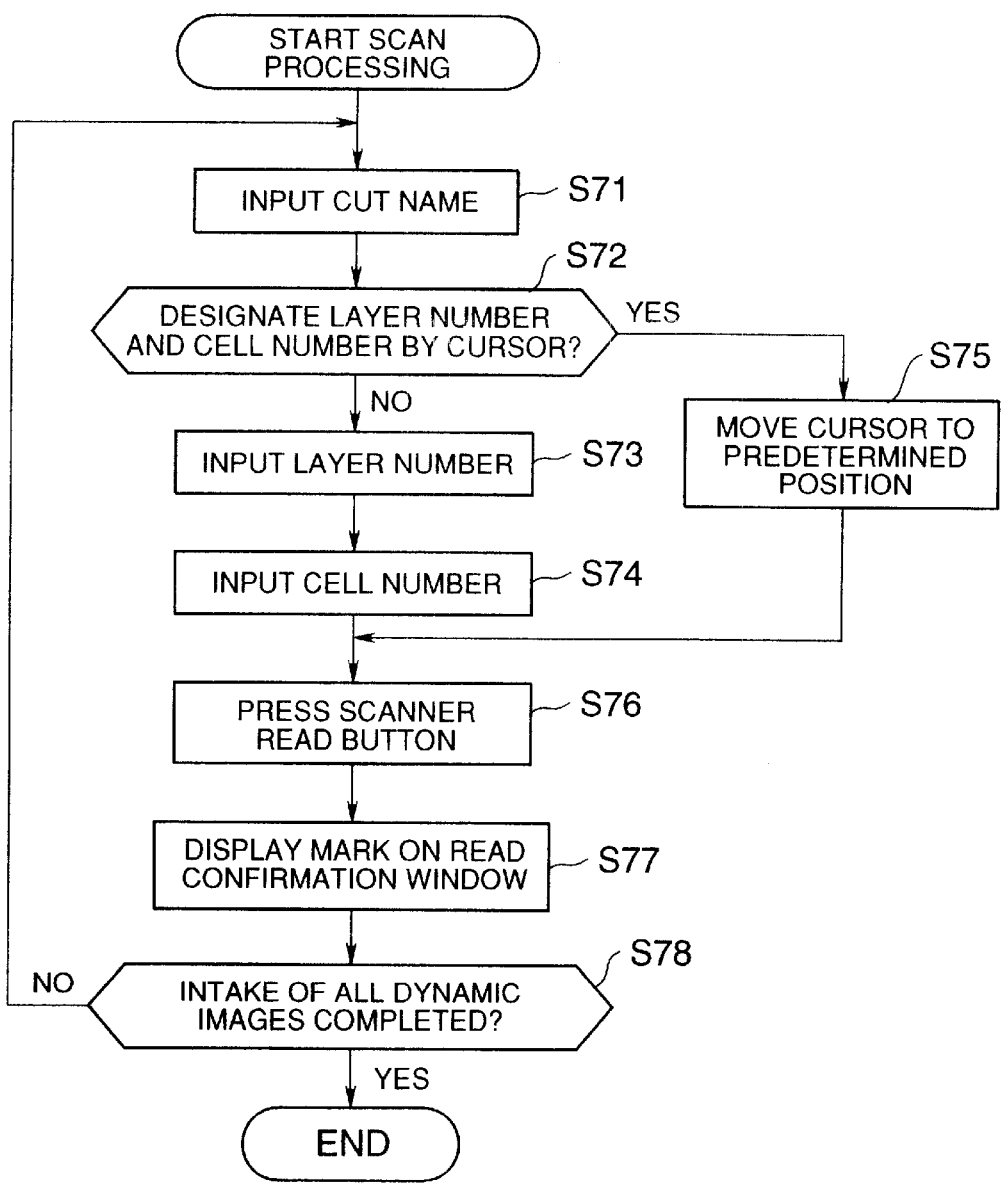
FIG. 7 is a flowchart for explaining scan processing.

FIG. 5 shows the flow of data which is generated when various processing is carried out. Each processing will now be carried out with reference to this flowchart. At step 41, a dynamic image drawn on paper by the writer using a pencil or a pen is taken in by the scanner 22. For example, when a command of scan processing is inputted by operating the mouse 9, the CPU 1 causes the CRT 5 to display an image as shown in FIG. 6 as a GUI (graphical user interface) for scan processing. Then, in accordance with this GUI, the user carries out scan processing as shown in the flowchart of FIG. 7.

First, at step S71, the user inputs the name of cut to a display section 701 of the GUI of FIG. 6. This input of the name is carried out by operating the keyboard 16. Next, the processing goes to step S72, where it is discriminated whether or not the user designates the layer number and the cell number by a cursor. If the user does not designate the layer number and the cell number by a cursor, the processing goes to step S73, where the layer number is inputted and displayed on a display section 702 of the GUI of FIG. 6 by operating the keyboard 16. At step S74, the cell number is inputted and displayed on a display section 703 by operating the keyboard 16.

If it is discriminated at step S72 that the user designates the layer number and the cell number by a cursor, the processing goes to step S75, where the user operates a cursor key of the keyboard 16 or the mouse 9 to shift a cursor 709 displayed in a read confirmation window 708 of the GUI of FIG. 6 to a predetermined position. Specifically, in the read confirmation window 708, cell numbers expressed by numerals are shown on the lateral axis and layer numbers expressed by alphabetic characters are shown on the longitudinal axis. Thus, the layer number and the cell number can be designated by shifting the cursor 709 to a predetermined position prescribed by the layer number and the cell number. In this example, though alphabetic characters are used as the layer numbers, such characters are described as numbers as a matter of convenience. Of course, the layer number may be expressed by numerals instead of alphabetic characters.

After the name of cut, the layer number and the cell number are designated in the foregoing manner, when the user presses a button 704 at step S76, the CPU 1 outputs a control signal to the scanner 22 through the input/output interface 14, thus executing scan processing. Then, when the scanner 22 scans one cell picture to receive the image taken in, the CPU 1 outputs the cell picture to a picture display window 707 and causes the picture display window 707 to display the cell picture. At step S77, the CPU 1 causes a mark 710 to be displayed at the position prescribed by the layer number and the cell number in the read confirmation window 708. This enables the user to quickly recognize the layer number and the cell number of the image already taken in.

Scanning may be carried out before the name of cut, the layer number and the cell number are inputted.

Next, the processing goes to step S78, where it is discriminated whether or not all the necessary dynamic images are taken in. If there is any dynamic image left to be taken in, the processing returns to step S71 and the subsequent processing is repeated. On completion of intake of all the dynamic images, the processing ends.

As shown in the GUI of FIG. 6, the image taken in can be rotated by +90 degrees or −90 degrees in accordance with the setting in a display section 705. Also, contrast correction or gamma correction can be carried out by suitably setting correction items associated with a filter displayed in a display section 706.

By thus carrying out scan processing, 24-bit original image data of full colors is obtained at step S42 of FIG. 5. As described above, this image data is filed with an extension of ".BMP" appended thereto. This file is recorded on the hard disk 13. As shown in FIG. 4, in the case where the file is scanned as a first cell picture of a layer A, it is recorded on the hard disk 13 with a file name of A0001.BMP.

Figure 8:
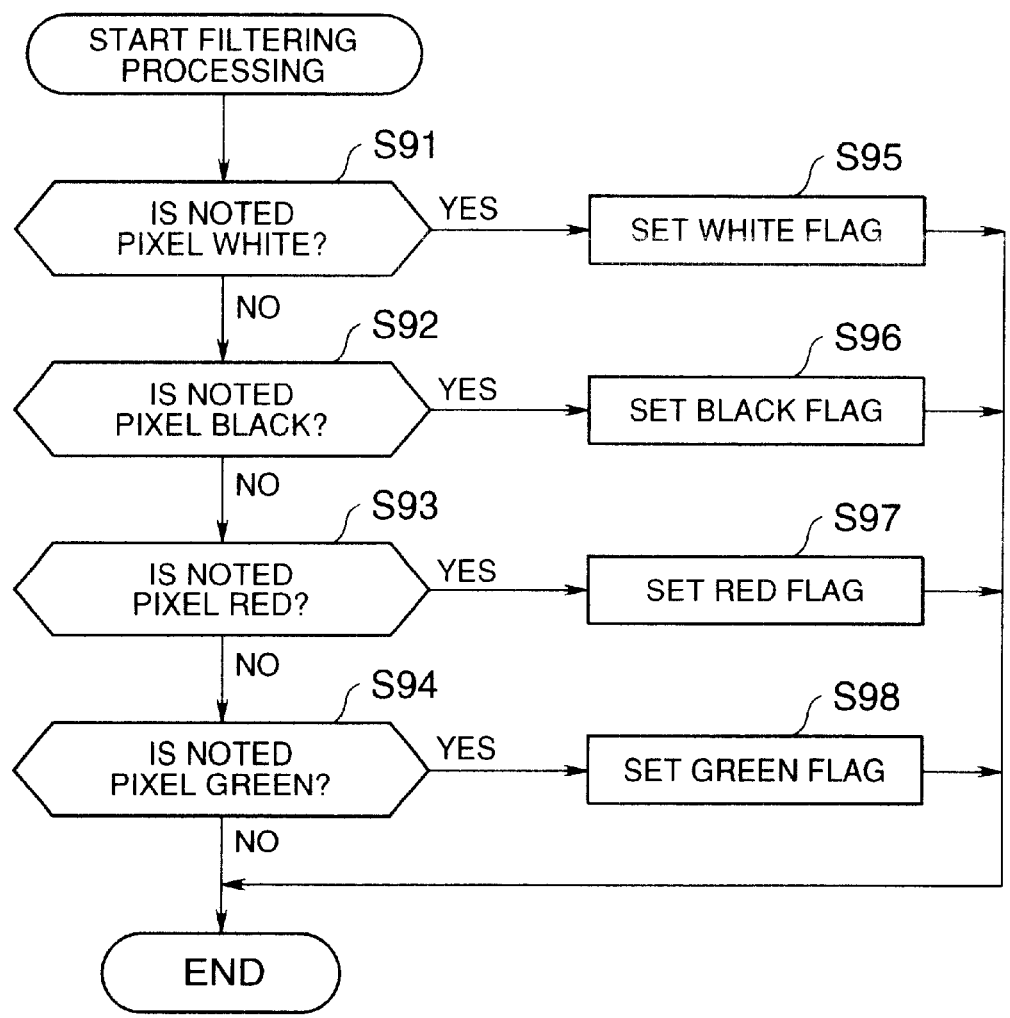
FIG. 8 a flowchart for explaining filtering processing.

At step S43, lightness data, chromaticity data and chroma data are calculated from 24-bit fall-color bit map data of RGB. At step S44, filtering processing is carried out. Detailed filtering processing is shown in FIG. 8.

First, at step S91, it is discriminated whether a noted pixel is white or not. If the value of lightness data of the noted pixel is greater than a predetermined threshold value and the values of chromaticity data and chroma data are smaller than predetermined threshold values, it is discriminated that the noted pixel is white. In this case, the processing goes to step S95, where the color of white is expressed by setting predetermined bits of the 8-bit data.

If it is discriminated at step S91 that the noted pixel is not white, the processing goes to step S92, where it is discriminated whether the noted pixel is black or not. If the values of lightness data, chromaticity data and chroma data are smaller than predetermined threshold values, respectively, it is discriminated that the noted pixel is black. In this case, the processing goes to step S96, where the color of black is set by setting predetermined bits of the 8-bit data.

If it is discriminated at step S92 that the noted pixel is not black, the processing goes to step S93, where it is discriminated whether the noted pixel is red or not. Whether the noted pixel is red or not is discriminated in accordance with whether the values of lightness data and chromaticity data and chroma data of the noted pixel are within the range of threshold values of red. If the noted pixel is red, the color of red is set by setting predetermined bits of the 8-bit data at step S97.

If it is discriminated at step S93 that the noted pixel is not red, the processing goes to step S94, where it is discriminated whether the noted pixel is green or not. In this discrimination, too, if the values of lightness data and chromaticity data of the noted pixel are within the range of predetermined threshold values of green, it is discriminated that the noted pixel is green. In this case, the processing goes to step S98, where the color of green is set by setting predetermined bits of the 8-bit data.

Figure 9:
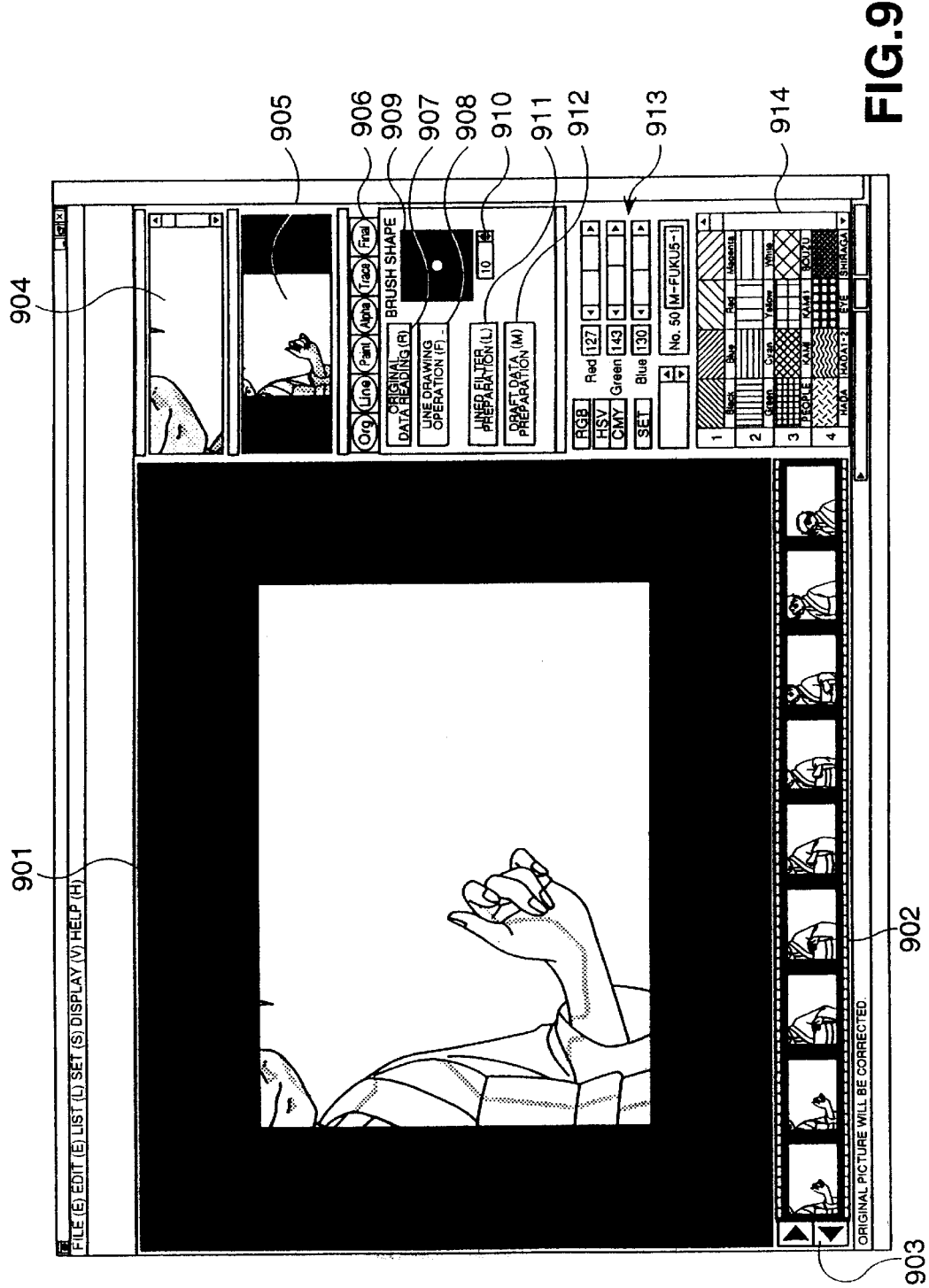
FIG. 9 shows an exemplary GUI for original data processing.

On completion of filter processing in this manner, the processing goes to step S45 of FIG. 5 and thinning processing is carried out. In this case, the CPU 1 causes the CRT 5 to display a GUI as shown in FIG. 9. In this GUI, pictures taken in of designated layers are sequentially displayed in a layer picture display window 902. By operating a button 903, the displayed cell pictures can be scrolled to the right or left. In a picture display window 901, a designated picture (e.g., the leftmost cell picture in FIG. 9) is displayed from among the cell pictures displayed in the layer picture display window 902.

In a window 904, a cell picture immediately before to the cell picture displayed in the picture display window 901 is displayed. In a window 905 below the window 904, the same cell picture as displayed in the picture display window 901 is displayed in a small size. By designating a predetermined position on the picture displayed in the window 905, the designated portion can be displayed in an enlarged manner in the picture display window 901.

Buttons 906 are operated for setting any one of original (Org), line (Line), paint (Paint), alpha (Alpha), trace (Trace), and final (Final) modes. In the example of FIG. 9, the original button is operated.

A button 907 is operated for reading the original image data which is taken in by the scanner 22 and recorded on the hard disk 13. A button 908 is operated for reading with an emphasis on the line drawing. In a window 909, the brush shape is displayed, and size of the brush can be changed by operating a button 910. Using the brush of the designated size, noise components of the line drawing displayed in the picture display window 901 can be removed.

A button 911 is operated for preparing a filter for carrying out arithmetic operation to convert 24-bit full-color image data to 8-bit color image data. A button 912 is operated for finding thinned data from the original image data displayed in the picture display window 901.

In a color selection window 914, a color palette is displayed which is used for coloring the picture displayed in the picture display window 901. When a predetermined color is designated from among colors on the color palette displayed in the color selection window 914, that designated color is displayed in a color setting window 913. By suitably setting and adjusting buttons of the color setting window 913, the color on one palette of the color selection window 914 can be set to a desired value (color).

Figure 10:
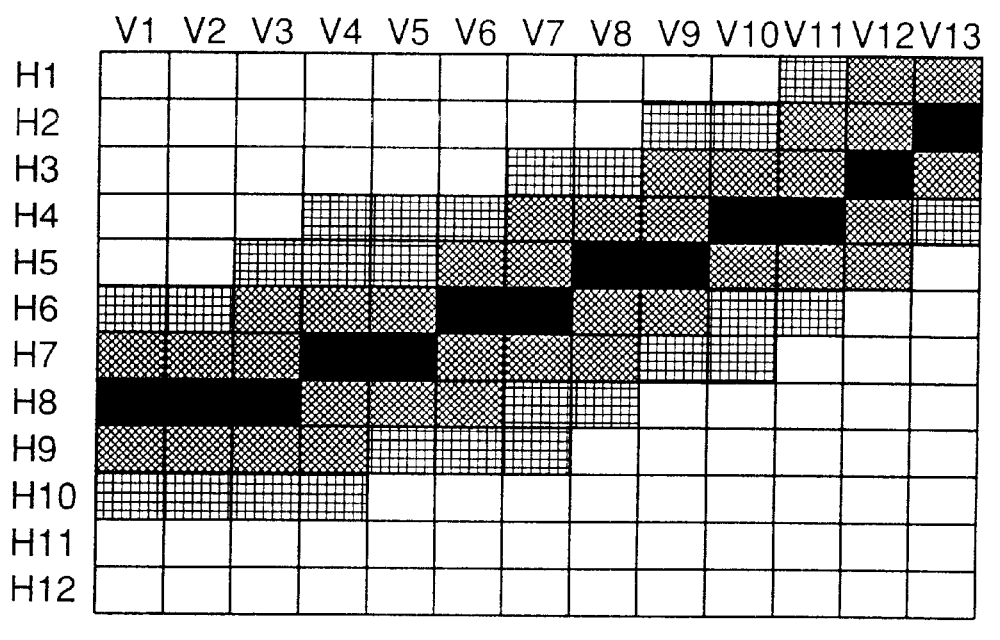

When the user operates the button 912 of FIG. 9, thinning processing is carried out at step S45 of FIG. 5. This thinning processing is the processing for converting a trace line having a predetermined thickness to a line having a width of one pixel. Specifically, since a trace line constituting a line drawing as an original picture is manually drawn with a pen or a pencil, it has an unstable thickness (width). When this line drawing is taken in by. the scanner 22 to form bit map image data, the trace line is expressed by a plurality of dots as shown in FIG. 10. In the example shown in FIG. 10, thinning processing is conversion to a line consisting of a total of 13 pixels at the center, that is, pixels of(H8, V1), (H8, V2), (H8, V3), (H7, V4), (H7, V5), (H6, V6), (H6, V7), (H5, V8), (H5, V9), (H4, V10), (H4, V11), (H3, V12) and (H2 V13).

This thinning processing is the processing for changing a black pixel in contact with a white pixel, to a white pixel by each thinning processing. In other words, the trace line is thinned by deleting a black pixel in contact with a white pixel. The trace line is thinned every time thinning processing is carried out. By repeating thinning processing for plural times, a line having a width of one pixel can be ultimately obtained.

In the case where one picture is constituted by 640×480 (=307200) pixels, these pixels are expressed in a binary form, that is, white pixels and pixels of the other colors (black, red or green pixels), by filtering processing at the above-described step S44. In this case, the white pixels are referred to as colorless pixels, and pixels of the other colors are referred to as colored pixels.

Figure 11:
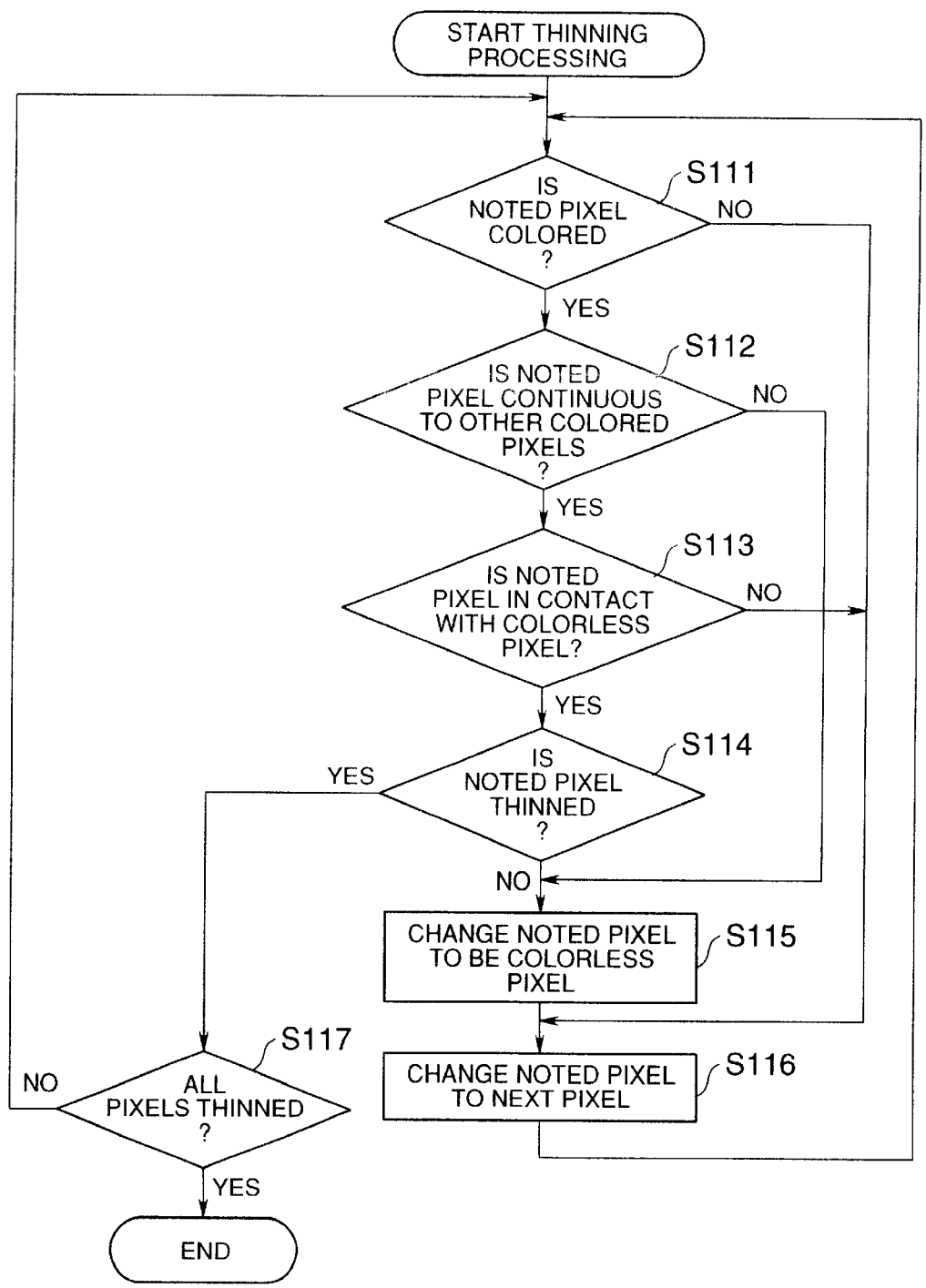
FIG. 11 is a flowchart showing thinning processing.

Referring to FIG. 11, thinning processing will now be described in detail. First, at step S111, it is discriminated whether a noted pixel is a colored pixel or not. If the noted pixel is a colorless pixel, the processing goes to step S116, where the noted pixel is changed to the next pixel. Then, the processing returns to step S111 and it is discriminated whether that noted pixel is a colored pixel or not.

Figures 12, 13:
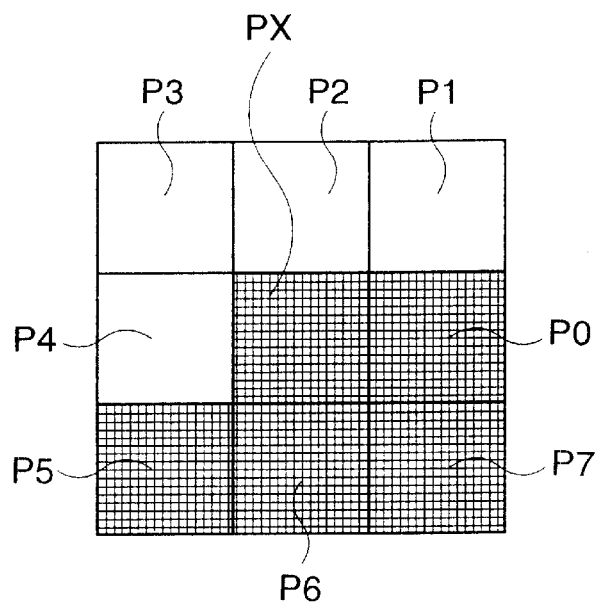
FIG. 12 is a view for explaining processing of FIG. 11.
FIG. 13 shows an exemplary fixed palette for thinned data.

If it is discriminated at step S111 that the noted pixel is a colored pixel, the processing goes to step S112 and it is discriminated whether or not the noted pixel is a pixel continuous to other colored pixels. Specifically, as shown in FIG. 12, it is checked whether eight pixels in contact with the noted pixel at the center are colorless pixels or colored pixels. If two or more of the eight pixels are colored pixels, it is discriminated that the noted pixel is a pixel continuous to colored pixels. On the other hand, if the noted pixel is expressed as a colored pixel in the binary form because of noise or the like, none of the eight pixels in contact with the noted pixel is a colored pixel (i.e., there is an isolated pixel), and therefore it is discriminated that this noted pixel is a pixel which is not continuous to other colored pixels.

If it is discriminated at step S112 that the noted pixel is not continuous to other colored pixels, the processing goes to step S115 and the noted pixel is changed to a colorless pixel. That is, the noise is removed. Then, the noted pixel is changed to the next pixel at step S116 and the processing returns to step S111.

If it is discriminated at step S112 that the noted pixel is continuous to other colored pixels, the processing goes to step S113 and it is discriminated whether or not the noted pixel is in contact with a colorless pixel. Specifically, if all of two pixels in the vertical direction and two pixels in the horizontal direction which are adjacent to the noted pixel at the center, that is, four pixels in total, are colored pixels, it can be discriminated that the noted pixel is a pixel within a trace line which is not in contact with a colorless pixel. Thus, in this case, the processing goes to step S116, where the noted pixels is changed to the next pixel. The processing then returns to step S111.

If it is discriminated at step S113 that any one of the four pixels in contact with the horizonal and vertical directions of the noted pixel is a colorless pixel, it is discriminated that the noted pixel is a pixel in contact with a colorless pixel, and the processing goes to step S114.

In the example shown in FIG. 12, of pixels P2 and P6 in contact with the vertical direction of a noted pixel PX and pixels P0 and P4 in contact with the horizontal direction, the pixels P4 and P2 are colorless pixels. Therefore, the processing goes to step S114.

At step S114, it is discriminated whether or not the noted pixel is a thinned pixel. Specifically, first, it is checked whether or not all the pixels in a first pixel set consisting of pixels P0, P1 and P2 located on the upper right side of the noted pixel PX, a second pixel set consisting of pixels P2, P3 and P4 located on the upper left side of the noted pixel, a third pixel set consisting of pixels P4, P5 and P6 located on the lower left side of the noted pixel, and a fourth pixel set consisting of pixels P6, P7 and P0 located on the lower right side of the noted pixel PX are colorless pixels. That is, it is checked whether or not all the pixels in any one of the first to fourth pixel sets are colorless pixels.

Then, if all the pixels in another pixel set are colorless pixels, it is checked whether or not a colorless pixel is included in the pixel set located on the opposite side. If a colorless pixel is not included in the pixel set on the opposite side, it can be discriminated that this noted pixel is a pixel located at the edge of a trace line. If a colorless pixel is included in the pixel set on the opposite side, it can be discriminated that the noted pixel is a thinned pixel (i.e., a pixel of a line having a width of one pixel).

In the example of FIG. 12, all the pixels of the second set (pixels P2, P3 and P4) are colorless pixels. Also, no colorless pixel is included in the fourth set of pixels (pixels P6, P7 and P0) on the side opposite to the second set of pixels. Thus, in such case, it is discriminated at step S114 that the noted pixel is a pixel located at the edge of a trace line. That is, it is discriminated that this noted pixel has not yet been thinned.

If it is discriminated at step S114 that the noted pixel is not a thinned pixel (i.e., if it is discriminated that the noted pixel is a pixel located at the edge of a trace line), the processing goes to step S115, where the noted pixel is changed to a colorless pixel. Thus, one colored pixel located at the edge of the trace line is changed to a colorless pixel. As a result, the trace line is thinned by one pixel. Next, the noted pixel is changed to the next pixel at step S116 and the processing returns to step S111.

If it is discriminated at step S114 that the noted pixel is a thinned pixel (i.e., if it is discriminated that the noted pixel is a pixel of a line having a width of one pixel), the processing goes to step S117, where it is discriminated whether or not all the pixels are thinned pixels. If all the pixels are not thinned pixels, the processing returns to step S111 and the subsequent processing is repeated. As this thinning processing is repeated, a line having a width of one pixel can be obtained.

By thus thinning the trace line before painting processing, generation of a non-painted portion can be prevented.

In the embodiment of the present invention, thinned data is expressed by eight bits. That is, the 24-bit pixel data obtained at step S42 is processed by the filter prepared by operating the button 911 of FIG. 9, and 8-bit thinned data is obtained at step S46.

In this embodiment, a lookup table (LUT) as shown in FIG. 13 is used to express the color of each pixel of the thinned data. This lookup table is a color palette for expressing the original color of each pixel of the thinned data, and internal data for the system is fixed so that the user cannot freely change the original color. That is, the lookup table is a fixed palette.

Figure 30:
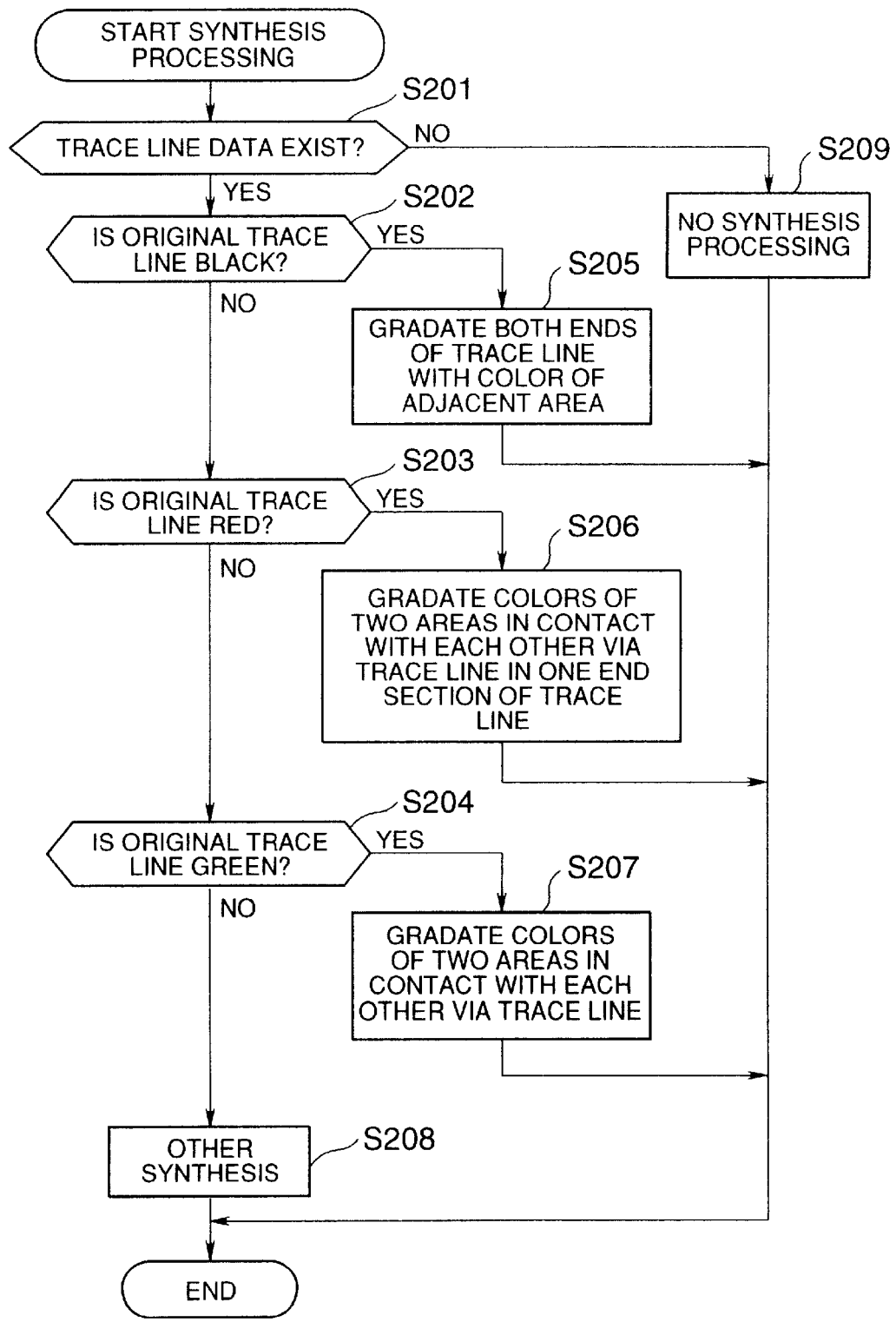
FIG. 30 is a flowchart for explaining synthesis processing.

In this embodiment of the invention, black, green or red is used as the color of the original trace line. (The meaning thereof will be later described with reference to FIG. 30.) Thus, if the trace line is black, the line is expressed by 8-bit data having a palette number 0. The red trace line is expressed by 8-bit data having a palette number 2. The green trace line is expressed by 8-bit data having a palette number 4. A white pixel having no trace line is expressed by 8-bit data having a palette number 7. As is clear from the fixed palette shown in FIG. 13, blue, yellow or the like may be used as the color of the trace line, other than black, green, and red.

Figure 14:
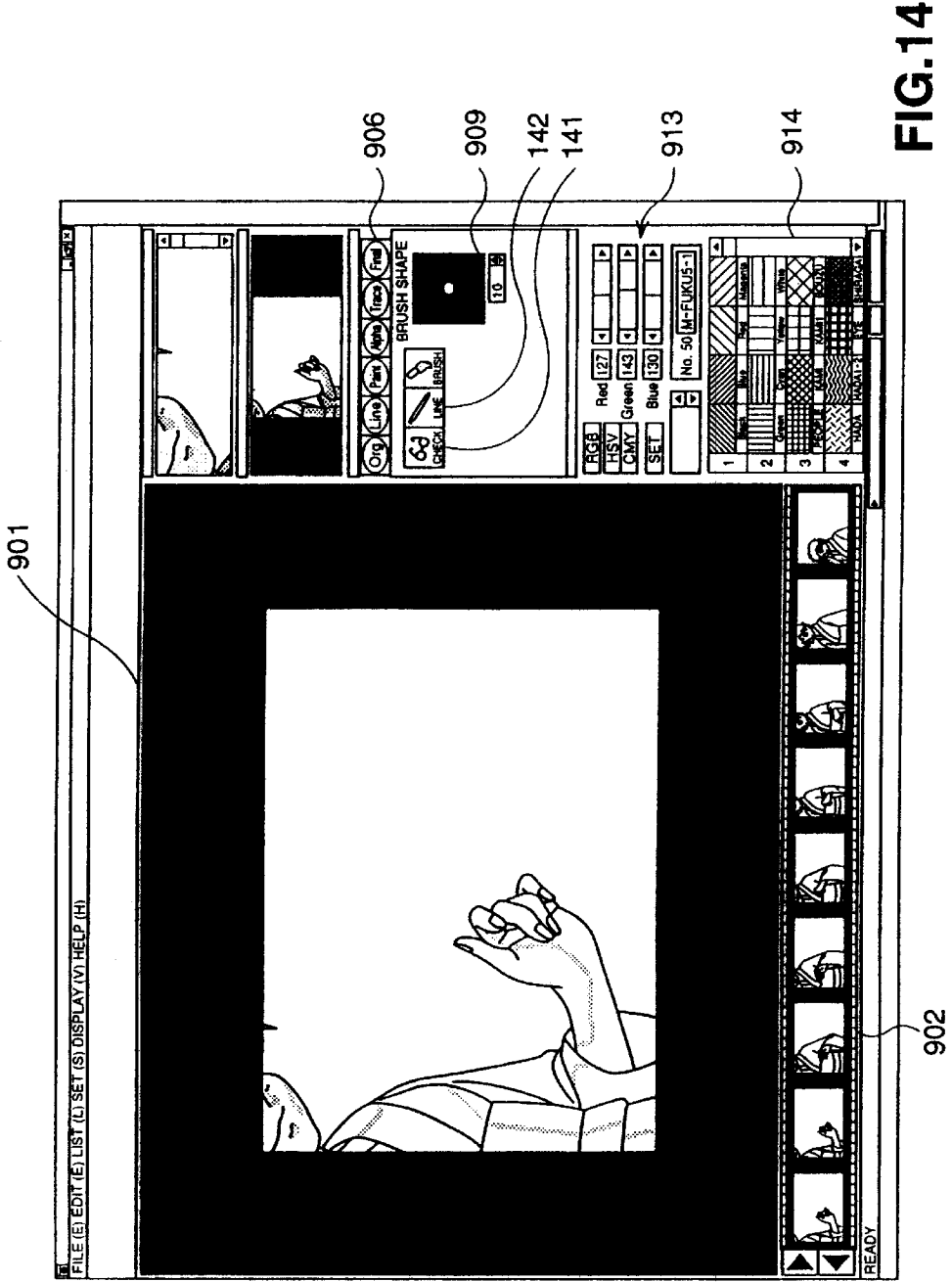
FIG. 14 shows an exemplary GUI for line processing.

On completion of processing of the original data as described above, as the line button of the buttons 906 is operated, a GUI for line processing is displayed on the CRT 5 as shown in FIG. 14. In this example, a picture constituted by a line having a width of one pixel thinned by thinning processing of step S45 is displayed in the picture display window 901. A button 141 is a button operated for checking whether or not an area is closed by the line having the width of one pixel. A button 142 is a button operated for correcting a gap in the case where it is found as a result of the checking that the line having the width of one pixel is not closed and forms a gap.

Figure 15:
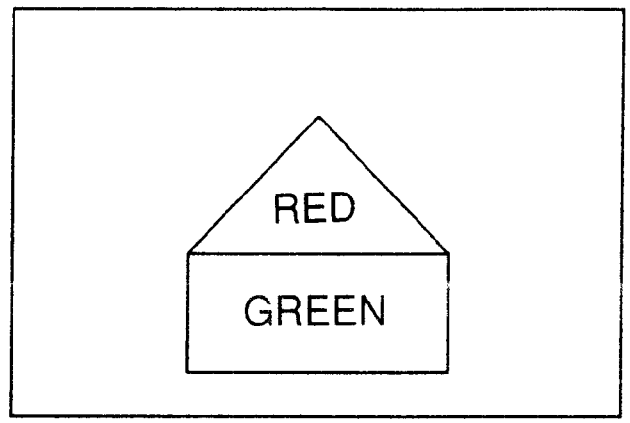
FIG. 15 is a view for explaining an area surrounded by a line.

Specifically, in this embodiment of the invention, in painting processing, as an area closed by the line having the width of one pixel is designated, all the pixels within the area can be automatically colored with a designated color, as will be later described. For example, in the state where patterns of a triangle and a rectangle closed by the line having the width of one line are displayed, if the triangle is designated and red is designated as the painting color, the inside of the triangle is colored with red, as shown in FIG. 15. Also if green is designated as the painting color for the rectangle, the inside of the rectangle is colored with green.

Figure 16:
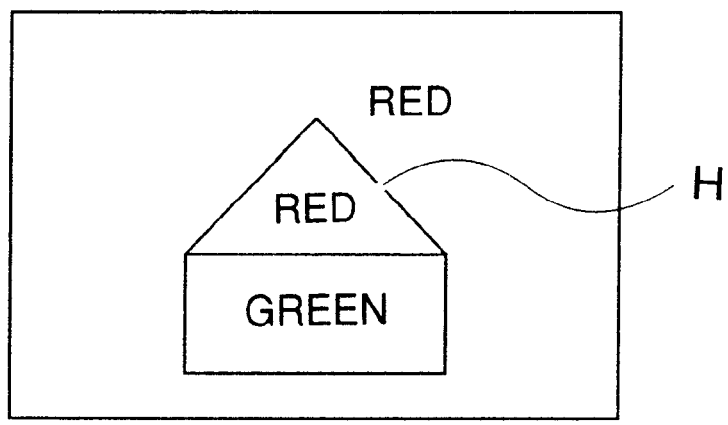
FIG. 16 is a view for explaining an area surrounded by a line.

However, in the case where a gap H is generated at a part of the line of the triangle and where the triangle is not closed, as shown in FIG. 16, if the triangle is designated as the area to be colored and red is designated as the painting color, not only the inside of the triangle but also the outside of the triangle is colored with red. As a result, it is impossible to color only a desired area with a desired color.

Figure 17:
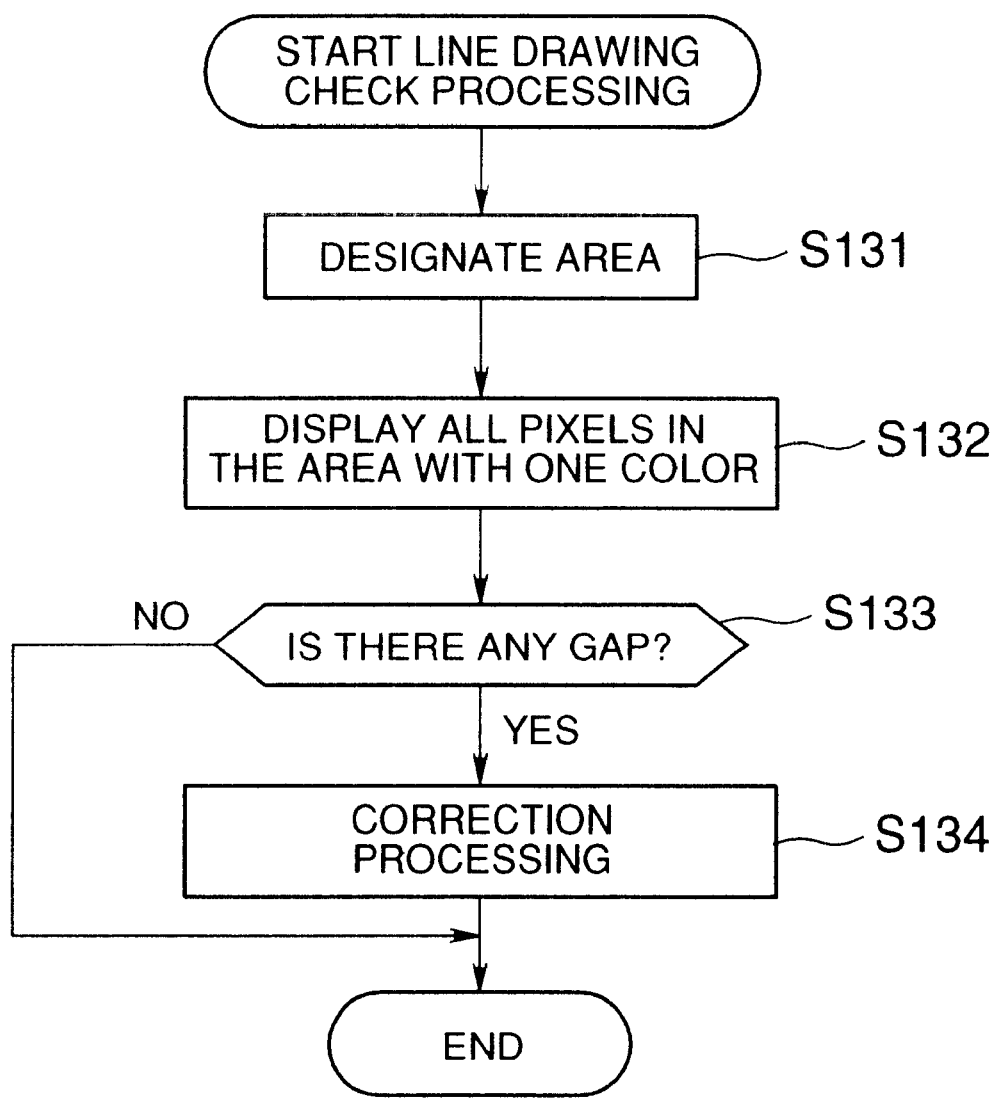
FIG. 17 is a flowchart for explaining line drawing check processing.

Thus, by operating the check button 141 shown in FIG. 14, whether the line having the width of one pixel is closed or not can be checked. That is, in this case, processing shown in the flowchart of FIG. 17 is carried out.

First, at step S131, the user operates the mouse 9 to designate a predetermined area of the line drawing drawn by the line having the width of one pixel displayed in the picture display window 901. At this point, the CPU 1 at step S132 colors all the pixels in the area designated at step S131 with one color, and causes the colored area to be displayed. This processing is carried out by changing the display color to a predetermined color, pixel by pixel, in the horizontal direction from the upper left part in the designated area. Similar processing is sequentially carried out with respect to more adjacent pixels. As a result, if there is an unclosed portion (gap H) on the line as shown in FIG. 16, pixels continuous therefrom to the outside are also colored.

The user can discriminate whether or not only the designated area is displayed in the predetermined color, from the displayed picture. If the outside of the designated area is displayed in the same color as the inside of the area, it is understood that there is a gap somewhere in the area. Thus, at step S133, it is discriminated whether or not there is a gap in the designated area. If it is discriminated that there is a gap, the processing goes to step S134 and processing for filling the gap is carried out. Specifically, a button 242 of FIG. 14 is operated to cause the discontinuous line to be continuous, thus closing the area with the line having the width of one pixel. If there is no gap, the processing of step S134 is skipped.

Figure 18:
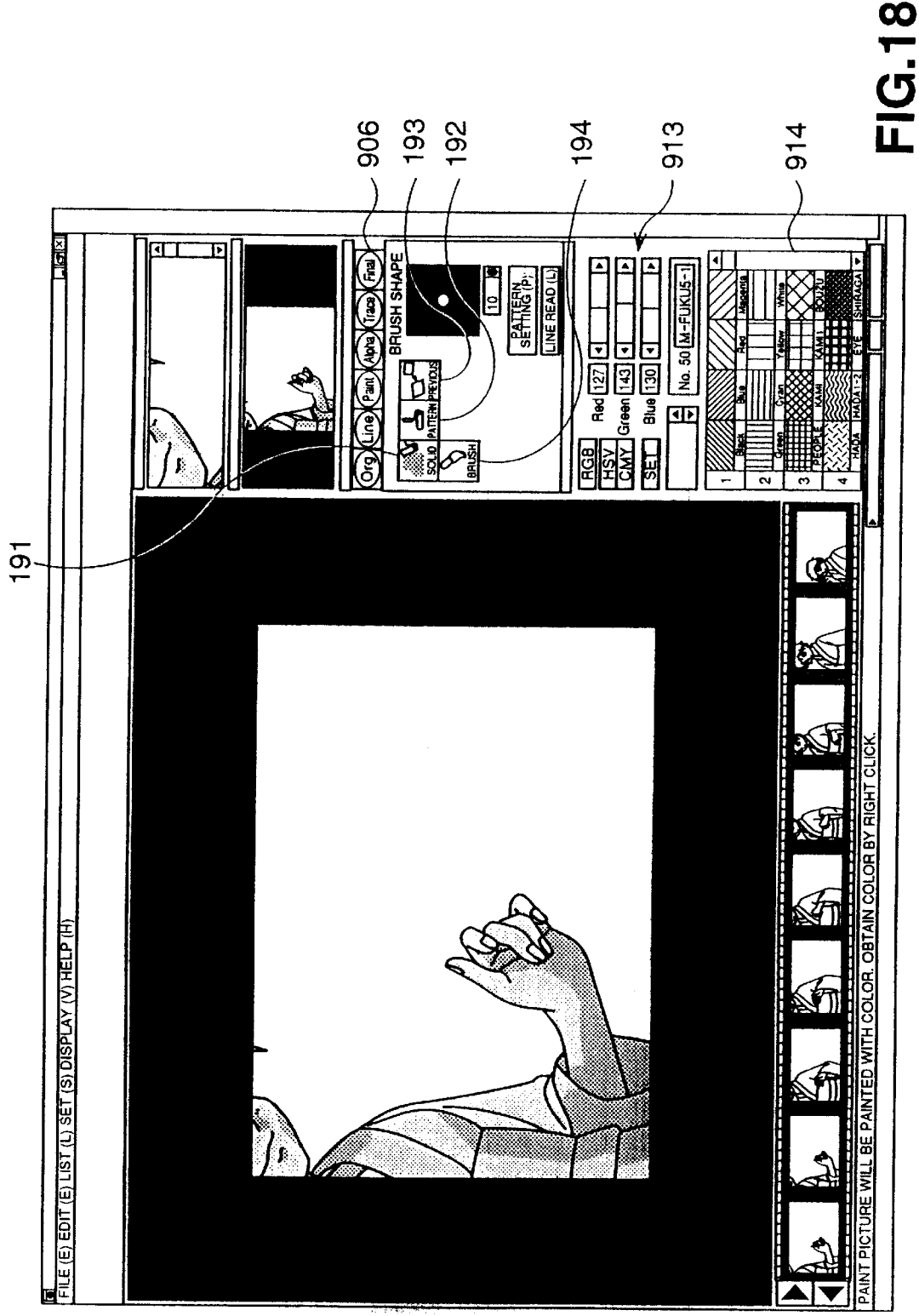
FIG. 18 shows an exemplary GUI for painting processing.

Next, the processing goes to step S47 of FIG. 5, where painting processing is carried out. At this point, the user presses the paint button of the buttons 906, as shown in FIG. 18. On the GUI, as shown in FIG. 18, a button 191 is displayed which is operated for painting, with a predetermined color, the area surrounded by the line having the width of one pixel. A button 192 is a button operated for painting a predetermined area with a predetermined pattern. A button 194 is a button operated for setting/selecting a pattern for painting. A button 193 is a button operated for painting a corresponding area with the same color as the color of the corresponding area of the previous frame (already colored frame).

Referring to the flowchart of FIG. 19, processing for painting the corresponding area of the processing target frame with the same color as the color of the corresponding area of the previous frame by operating the button 191 of FIG. 18 will now be described. First, at step S151, the user discriminates whether or not all the areas are to be colored with the same color as the previous frame. If all the areas are not employed as the processing target, the processing goes to step S152, and the user operates the mouse 9 to designate the area to be pained with the same color as the corresponding area of the previous frame. When the predetermined area is designated, the CPU 1 at step S153 retrieves the corresponding closed area of the previous frame.

Figure 20:
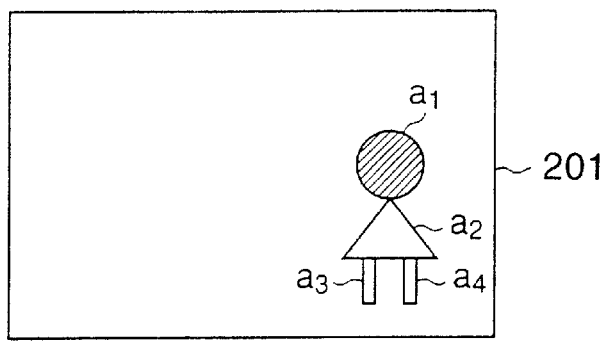
FIG. 20 is a view for explaining operation for detecting a corresponding closed area.
Figure 21:
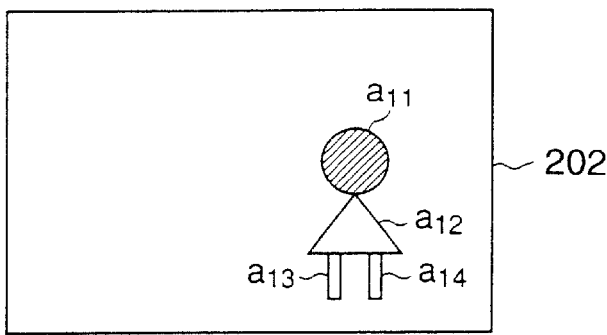
FIG. 21 is a view for explaining operation for detecting a corresponding closed area.
Figure 22:
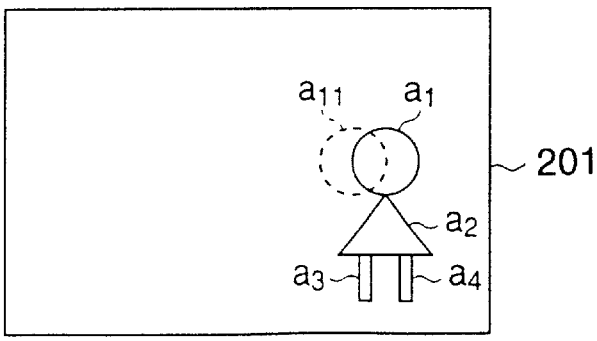
FIG. 22 is a view for explaining operation for detecting a corresponding closed area.

For example, it is assumed that a cell picture 201 shown in FIG. 20 is the picture of the previous frame and that a cell picture 202 shown in FIG. 21 is the picture of the next frame. Ares a1 to a4 in the cell picture 201 correspond to areas a11 to a14 in the cell picture 202, respectively. Normally, since it is a dynamic image, the position of the frame picture shown in FIG. 21 and the position of the frame picture shown in FIG. 22 are slightly shifted from each other. However, this shift is not so large because these pictures are of the adjacent frames. On the assumption that 30 frames exist in one second, the temporal difference between these frame pictures is 1/30 seconds.

Thus, on the assumption that the area a11 is designated, the CPU 1 virtually draws the area a11 of the cell picture 202 of FIG. 21 on the screen of the cell picture 201, as shown in FIG. 22. In this case, the range of the area a11 overlaps any one of the areas a1 to a4 of the cell picture 201. The CPU 1 determines an area having the largest overlapping range with the area a11, from among the areas a1 to a4, as the area corresponding to the area a11. In the example of FIG. 22, the area a1, from among the areas a1 to a4, is the area having the largest overlapping range with the area a11. Thus, the area a1 is determined as the area corresponding to the area a11. At this point, the color of the area a11 is detected.

Figure 19:
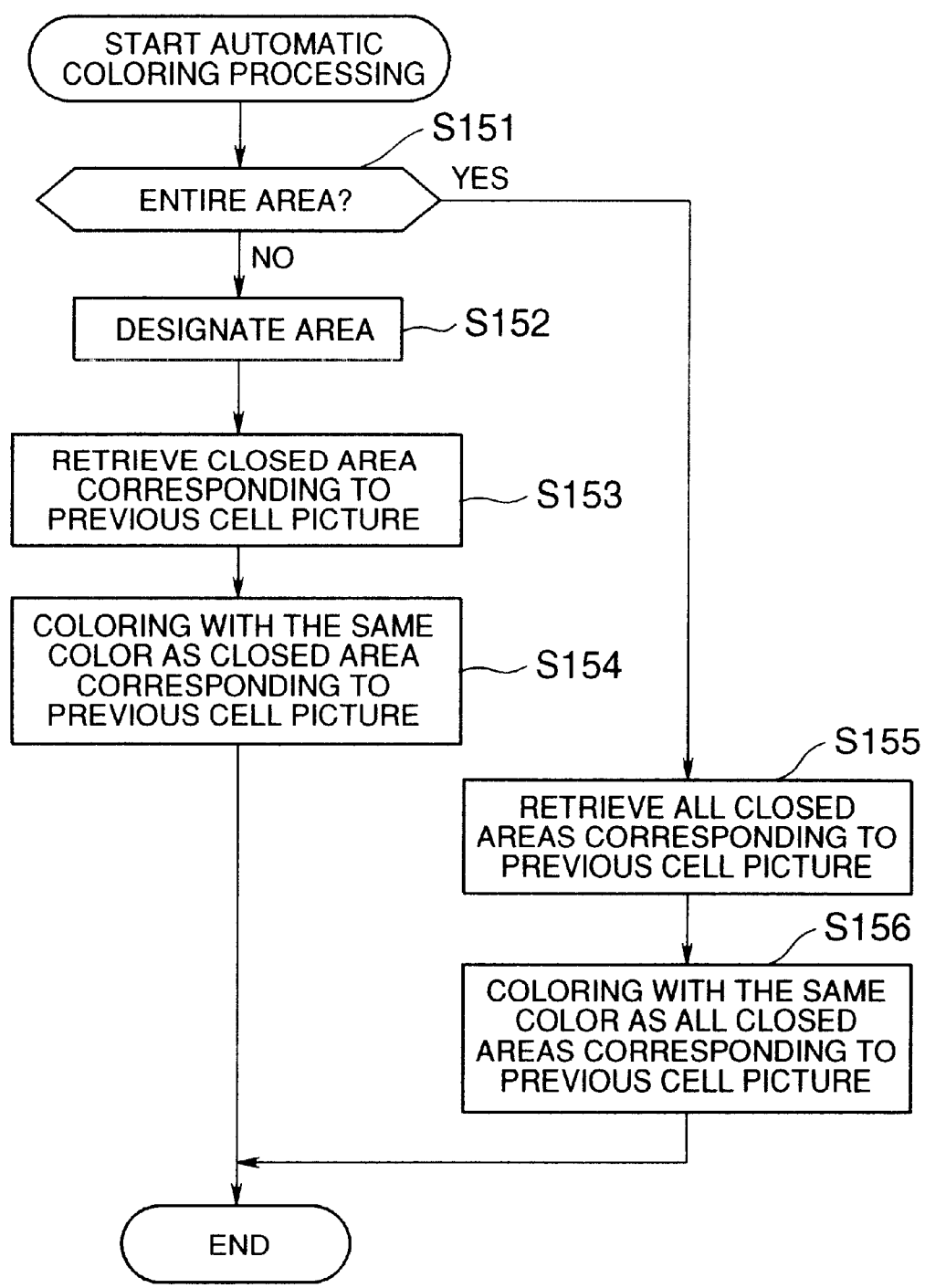
FIG. 19 is a flowchart for explaining automatic coloring processing.

Next, the processing goes to step S154 of FIG. 19, and the CPU 1 colors the area (area a11 of FIG. 21) in the processing target frame with the same color as the corresponding area (area a1 of FIG. 20) in the previous frame.

If it is discriminated at step S151 that not only the designated area but all the areas are to be automatically colored, the processing goes to step S155 and all the corresponding areas in the previous frame are retrieved. In the example of FIG. 21, not only the area corresponding to the area a11 but also the areas corresponding to the areas a12 to a14 are retrieved on the cell picture of FIG. 20 of the previous frame. Then, the processing goes to step S156 and processing for coloring all the retrieved areas with the same color is carried out. Specifically, in the example of FIG. 21, not only the area a11 is colored with the same color as the area a1, but also the area a12 is colored with the same color as the area a2. The area a13 is colored with the same color as the area a3, and the area a14 is colored with the same color as the area a4.

On the other hand, each area can be colored with a color designated on the color palette, by operating the button 191. In this case, the user designated a predetermined color from the color palette of the color selection window 914, and designates a predetermined area of the line drawing displayed in the picture display window 901. At this point, the CPU 1 colors the designated area with the designated color.

When the user paints each area by painting processing, color data is appended to white dots of the thinned data. This color data is hereinafter referred to as paint data. As described above, the thinned data is constituted by the black, green, or red trace line data and the other white data. Therefore, the paint data generated by painting processing is constituted by the black, green, or red thinned track line data and the color data applied to the white area.

Each pixel of this paint data is constituted by 8-bit data having a palette number for expressing the painted color, similarly to the 8-bit data of the thinned data. FIG. 23 shows an exemplary lookup table used in this paint data. As described above (or as shown in FIG. 13), since the palette numbers 0 to 7 are used by the system, the user can use colors of the palette numbers 8 to 207. Various patterns are allocated to the palette numbers 208 to 255.

By carrying out the above-described painting processing, first paint data consisting of eight bits is obtained at step S48 of FIG. 5.

The 8-bit first paint data obtained at step S48 is processed by line removal processing at step S49, and becomes 8-bit second paint data at step S50.

The second paint data is generated from the thinned data generated by thinning processing and the paint data (first paint data) generated by painting processing. This second paint data is data obtained by removing the thinned trace line data from the first paint data. Specifically, as the pixels expressing the trace line of the thinned data are caused to be colorless pixels, the second paint data becomes data expressing only the pixels colored by painting processing. That is, in the second paint data, 8-bit data indicating colored pixels is allocated to the colored pixels, and 8-bit data indicating colorless pixels is allocated to the picture expressing the trace line thinned by thinning processing and the pixels which have not yet been colored by painting processing. The color palette referring to the second paint data is the same color palette as the color palette referring to the first paint data.

Meanwhile, when the first paint data is obtained at step S48, the CPU 1 at step S51 prepares 8-bit thinned alpha key data. The alpha key is data indicating whether each pixel is colored or not. Each pixel of this alpha key data is expressed by eight bits. For example, in the embodiment of the present invention, "255" indicating colored pixels is allocated to pixels colored by painting processing, and "0" indicating colorless pixels is allocated to uncolored pixels. Since the thinned pixels are colored, "255" indicating colored pixels is allocated thereto.

Although this alpha key data is generated from the paint data, it may be generated from the thinned data and the paint data.

With respect to this thinned alpha key data, a fixed palette as shown in FIG. 24 is allocated. Thus, when this thinned alpha key data is displayed on the CRT 5, the colored pixels colored by painting processing and the thinned pixels are displayed in white, and the uncolored pixels are displayed in blue.

Figure 25:
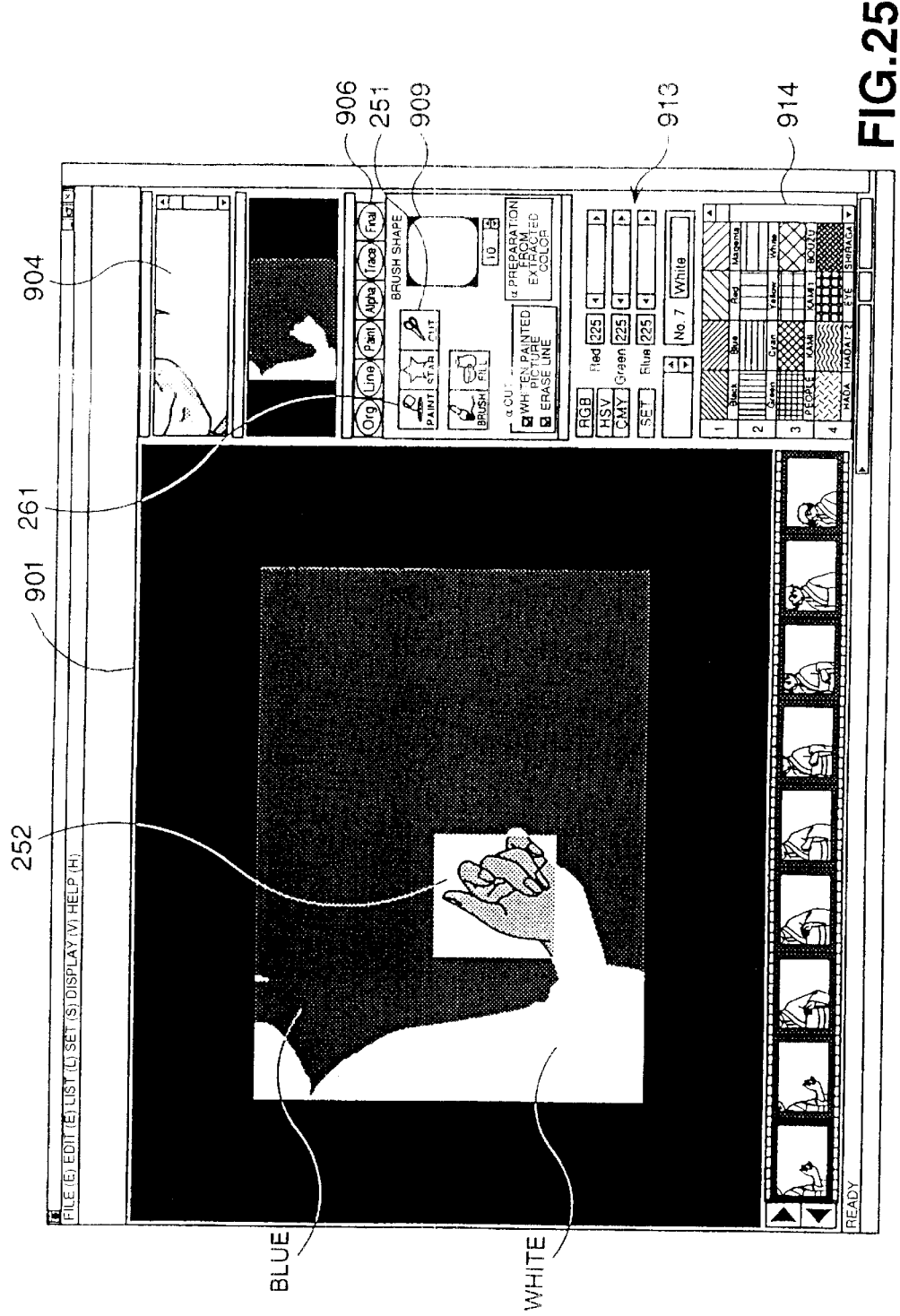
FIG. 25 shows an exemplary GUI for alpha key processing.

FIG. 25 shows the state where the alpha button of the buttons 906 is operated to display the alpha key data in the picture display window 901. A button 251 displayed at this point is a button operated for cutting a transparent area which should not be colored so that this transparent area will not be displayed. Also, in this example, a view window 252 is displayed at a part of the area displaying the alpha key picture. In this view window 252, the picture processed by painting processing (i.e., the picture shown in FIG. 18) is displayed at a corresponding position. That is, by shifting the view window 252 to a predetermined position, the user can confirm the alpha key data picture and the paint data picture at the corresponding position without switching the display mode. If a non-painted area which is left to be painted is found, the user can immediately paint the area with a predetermined color without switching the display mode.

Figure 26:
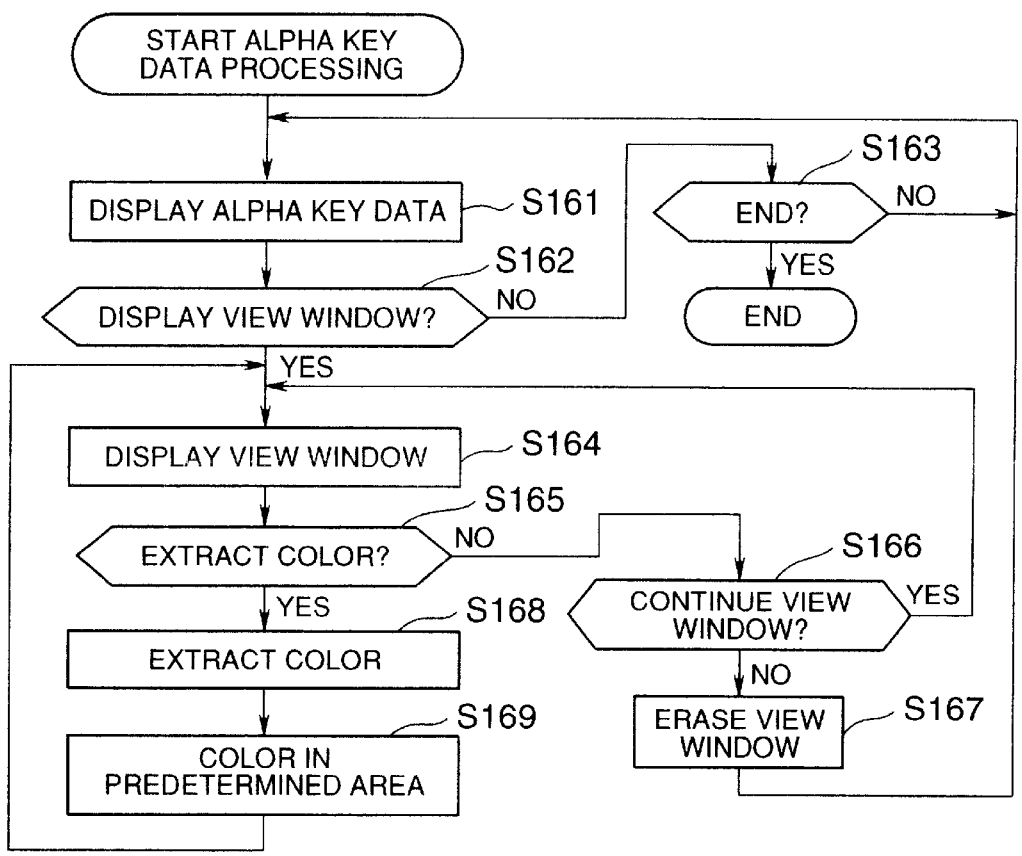
FIG. 26 is a flowchart for explaining alpha key data processing.

The processing in this case will now be described in detail with reference to the flowchart of FIG. 26. Specifically, at step S161, processing for displaying the alpha key data in the picture display window 901 as shown in FIG. 25 is carried out. At this point, the user at step S162 discriminates whether or not the view window 252 needs to be displayed for viewing the painted picture. If the view window 252 need not be displayed, the processing goes to step S163 and it is discriminated whether alpha key processing is to be ended or not. If not, the processing returns to step S 161.

If it is discriminated at step S162 that the view window 252 needs to be displayed, the processing goes to step S164 and the user clicks the right button of the mouse 9 to display the view window 252. The view window 252 is displayed at a position where the cursor is located at that time. Next, the processing goes to step S165, and the user discriminates whether or not a color should be extracted so as to carry out processing for coloring a predetermined area, in the state where the alpha key data picture is displayed. If it is discriminated that a color need not be extracted, the processing goes to step S166 and it is discriminated whether or not the display of the view window 252 is to be continued. If the display of the view window 252 is to be continued, the processing returns to step S164.

The view window 252 is displayed throughout the time period during which the right button of the mouse is clicked. By shifting the mouse 9 with its right button clicked, the view window 252 is shifted and the painted picture at a predetermined position can be confirmed. When it is determined that the view window 252 no longer needs to be displayed, the user cancels the click of the right button of the mouse 9. At this point, the processing goes from step S166 to step S167 and the display of the view window 252 is erased. After that, the processing returns to step S161.

If it is determined at step S165 that a color needs to be extracted, the processing goes to step S168 and the user carries out processing for extracting a color. Although not shown, a pattern of syringe is displayed substantially at the center of the view window 252. By clicking the left button of the mouse 9, the user extracts (stores) the color of the painted picture displayed near the inlet of the syringe pattern. In this state, the user proceeds to step S169, operates the mouse 9 to shift the view window 252 (syringe) onto an uncolored area, and then cancels the click of the left button of the mouse. At this point, the CPU 1 colors that area (the area of the painted picture) with the stored (extracted) color.

Thus, coloring with a desired color can be quickly carried out without switching the display mode.

Figure 27:
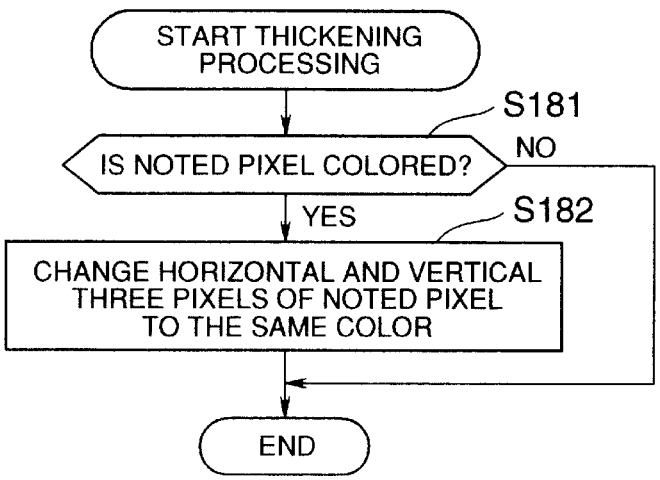
FIG. 27 is a flowchart for explaining thickening processing.

Referring to FIG. 5 again, at step S52, the CPU 1 carries out thickening processing on the pixel data obtained as a result of filtering processing at step S44. This thickening processing is processing for thickening the trace line, which is the reverse processing of thinning processing of step S45. This processing will be described with reference to the flowchart of FIG. 27.

First, at step S181, it is discriminated whether a noted pixel is a colored pixel or not. As described above, each pixel is identified as a colorless, black, red, or green pixel by filtering processing. From the result of identification, it can be discriminated whether the noted pixel is a colored pixel or not. If the noted pixel is a colored pixel, the processing goes to step S182, where processing for changing three pixels in the horizontal direction and three pixels in the vertical direction of the noted pixel to the same color as the noted pixel is carried out. This processing is carried out, whether the noted pixel is a pixel located inside of the trace line or a pixel located at the edge of the trace line. The processing of step S182 is carried out preferentially on a red or green pixel rather than a black pixel. That is, if there are a black pixel and a green pixel in contact with the noted pixel, or if there are a black pixel and a red pixel in contact with the noted pixel, the peripheral three pixels are changed not to black but to green or red.

If the noted pixel is a colorless pixel, the processing of step S 182 is skipped.

Figure 28:
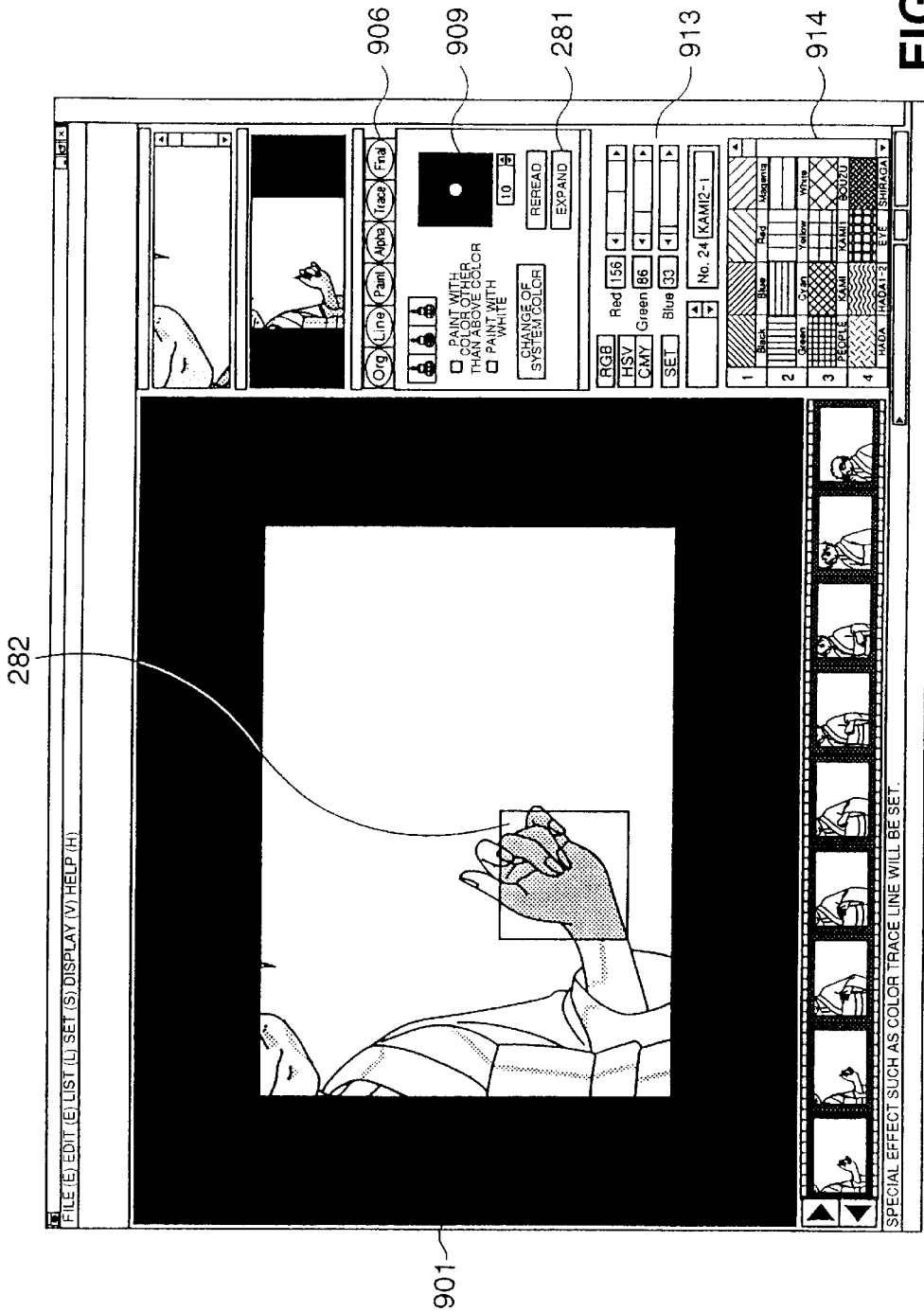
FIG. 28 shows an exemplary GUI for trace line processing.

FIG. 28 shows an exemplary GUI in the case where the trace button of the buttons 906 is operated to set a trace line processing mode. This GUI is used for carrying out trace line painting processing at step S53 after thickening processing is carried out at step S52 of FIG. 5. In this GUI, the line drawing of the original picture taken in, after being processed by thickening processing at step S52, is displayed in the picture display window 901. Although thickening processing of step S52 is automatically carried out, the width of the line can be further thickened by operating a button 281.

Trace line painting processing of step S53 is processing for changing the color of the thickened trace line. In this processing, only the color of the pixels of the thickened data generated by thickening processing is changed, and the color of the other pixels is not changed. This designation of the color is carried out basically in a manner similar to painting processing of step S47.

Each pixel of the trace line, on which the color is designated, is constituted by 8-bit data similarly to the paint data. By this 8-bit data, the palette number is designated. The color palette designated by the palette number is caused to be the same color palette as the color palette of the corresponding paint data.

In the state where the picture of this trace line painting processing is displayed, a view window 282 can be displayed similarly to the case described with reference to FIG. 25. In the view window 282, the paint data picture at the corresponding position is displayed and the trace line is displayed in the color of the original trace line (i.e., the color identified by filter processing of step S44). That is, though each trace line processed by thickening processing can be colored with an arbitrary color by this trace line painting processing, the color of the original trace line constitutes a kind of command, as will be later described with reference to FIG. 30. Thus, the command can be confirmed by displaying the original color instead of the color applied in the view window 282.

As trace line painting processing is carried out in the foregoing manner, 8-bit trace line color data can be obtained at step S54.

At step S55 of FIG. 5, density data is extracted from the lightness data, chromaticity data and chroma data generated at step S43. Specifically, the line drawing on the dynamic image has a density, and the density is taken in at this point. This density data is expressed by eight bits. Therefore, the density of 256 gradations is expressed. This density data is found regardless of the color such as black, red, or green.

Figure 29:
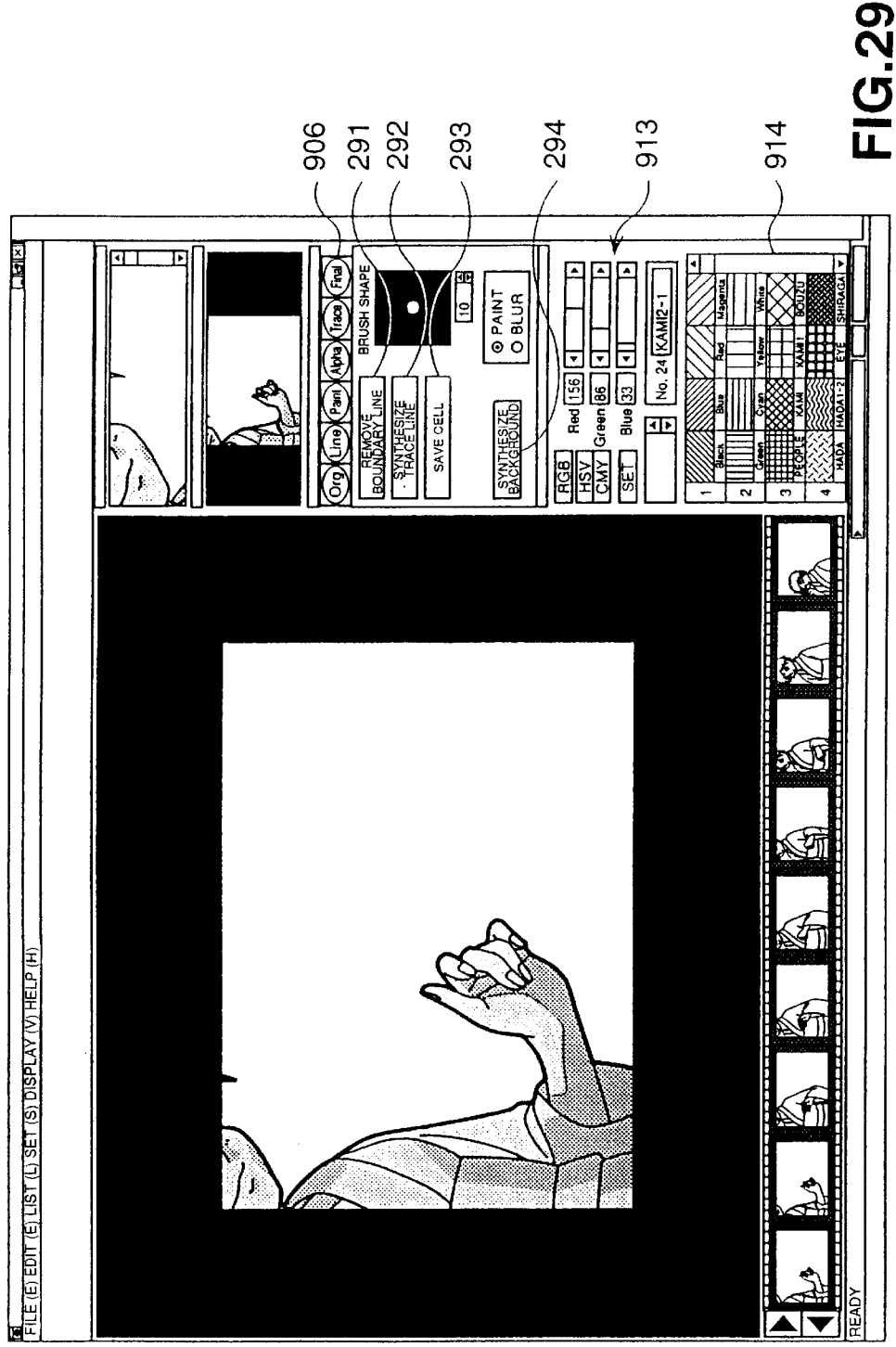
FIG. 29 shows an exemplary GUI for final processing.

FIG. 29 shows an exemplary GUI in the case where the final button of the buttons 906 is operated to set a final processing mode. A button 291 displayed at this point is operated for removing a boundary line. Specifically, the first paint data is obtained at step S48 as a result of painting processing at step S47 of FIG. 5. Then, by operating this button 291, line removal processing is carried out at step S49 and the second paint data is obtained at step S50. A button 292 is operated for synthesizing the painted trace line generated by trace line painting processing of step S63 with the painted picture generated by painting processing of step S47. A button 293 is operated for saving the synthesized picture. A button 294 is operated for synthesizing the picture with a background picture.

At step S57 of FIG. 5, synthesis processing is carried out by using the GUI of FIG. 29. In this synthesis processing, the second paint data obtained at step S50, the trace line color data obtained at step S54 and the density data obtained at step S56 are used. This synthesis processing will now be described in detail with reference to the, flowchart of FIG. 30.

First, at step S201, it is discriminated whether or not a pixel of the trace line exists as a pixel for synthesis. If a pixel of the trace line exists, it is discriminated at steps S202 to S204 whether the color of the original trace line is black, red, or green.

If it is discriminated at step S202 that the color of the original trace line is black, the processing goes to step S205, where both ends (or both edges) of the trace line are gradated with the color of the area in contact with both ends.

Figure 31C:
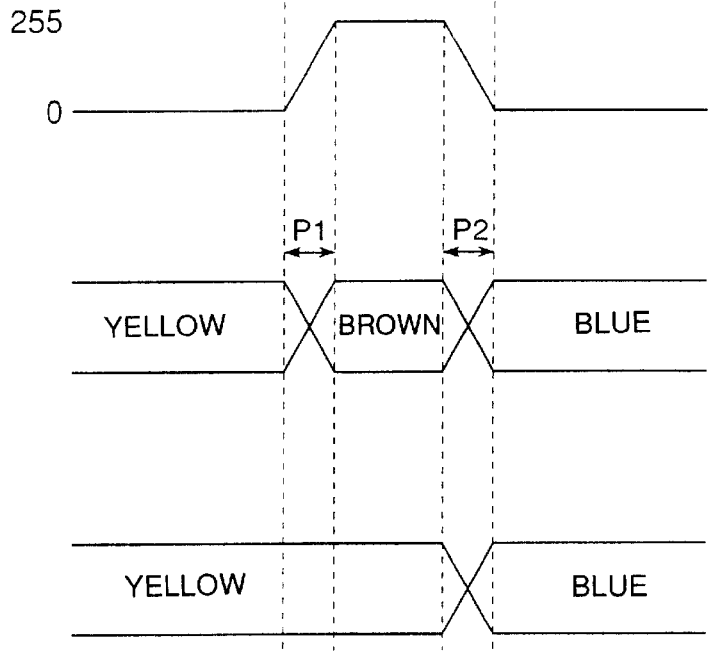

For example, it is assumed that an area having the color of yellow and an area having the color of blue as the second paint data are in contact with one side and the other side of the trace line, respectively, as shown in FIG. 31A. The data of the thinned trace line of FIG. 31A is removed. Also, it is assumed that the thickened trace line is painted in brown, as shown in FIG. 31B. In accordance with thickening of FIG. 31B, the trace line is thickened by three pixels. In addition, it is assumed that the density data of the trace line has the maximum value of 255 at the center of the trace line and has such distribution that its value is reduced to 0 as it goes away from the center, as shown in FIG. 31C.

In such state, if the color of the original trace line is black, synthesis processing as shown in FIG. 31D is carried out. Specifically, the color of brown of the trace line and the color of yellow of the one area are gradated in a section P1 in accordance with the density distribution. Similarly, the color of brown of the trace line and the color of blue of the other area are gradated in a section P2 in accordance with the density of the trace line.

If the data obtained as a result of synthesis (gradation) is represented by M, the second paint data is represented by C1, the trace line color data is represented by C2, and the density data is represented by L, the synthesized data M is expressed by the following equation.

$$M=\{(C1 \times L)+(C2 \times 255-L)\}/255$$

Each of these data is 8-bit data.

On the other hand, if it is discriminated at step S203 that the color of the original trace line is red, the processing goes to step S206, where the colors of two areas in contact with each other via the trace line are gradated in the section on one edge of the trace line.

That is, the yellow area and the blue area in contact with each other via the trace line are gradated in the section P2 on the one end of the trace line (in this case, the right end), as shown in FIG. 31E. At this point, the trace line is omitted.

Moreover, if it is discriminated at step S204 that the color of the original trace line is green, the processing goes to step S207, where the colors of two areas in contact with each other via the trace line are gradated in a section P3 of the thickened trace line.

Figure 31F:
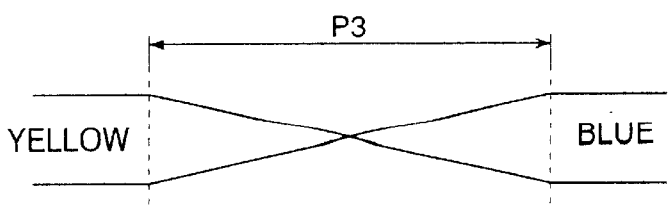

That is, the yellow area and the blue area are gradated in the section P3, as shown in FIG. 31F. In this case, too, the trace line is omitted.

If it is discriminated at steps S202 to S204 that the color of the original trace line is none of black, red, and green, other synthesis processing is carried out at step S208.

Meanwhile, if it is discriminated at step S201 that a pixel of the trace line does not exist as a noted pixel for synthesis, the processing goes to step S209. Since there is no particular picture to be synthesized, only the painting-processed picture is used.

Thus, desired synthesis can be carried out by drawing the original trace line in black, red, or green. Therefore, in drawing a dynamic image, a desired synthesized image can be obtained by suitably using black, red, or green.

By the foregoing processing, 8-bit synthesized image data is obtained at step S58. This 8-bit synthesized image data is converted to 24-bit final image data of full colors at step S59. That is, each pixel is converted to the 24-bit color registered on the color palette.

At step S60, the thinned alpha key data generated at step S51 and the density data generated at step S56 are synthesized to generate final alpha key data Fα.

If the density data is represented by L and the thinned alpha key data is represented by α, the final alpha key data Fα is expressed by the following equation.

$$F\alpha = \text{Max}(L, \alpha)$$

In this equation, Max (A, B) means that the greater one of A and B is selected. That is, the greater data of the density data L and the thinned alpha key data α is selected as the final alpha key data.

This final alpha key data is used as a key signal in synthesizing images of other layers. Processing in this case will be later described in detail with reference to FIG. 35.

As described above, as synthesis processing of step S60 is carried out, the final alpha key data is obtained at step S61.

Moreover, at step S62, Targa data is generated from the 24-bit final image data obtained at step S59 and the 8-bit final alpha key data obtained at step S61. This data has an extension of ".TGA" appended thereto and is saved as a Targa file.

Figure 32:
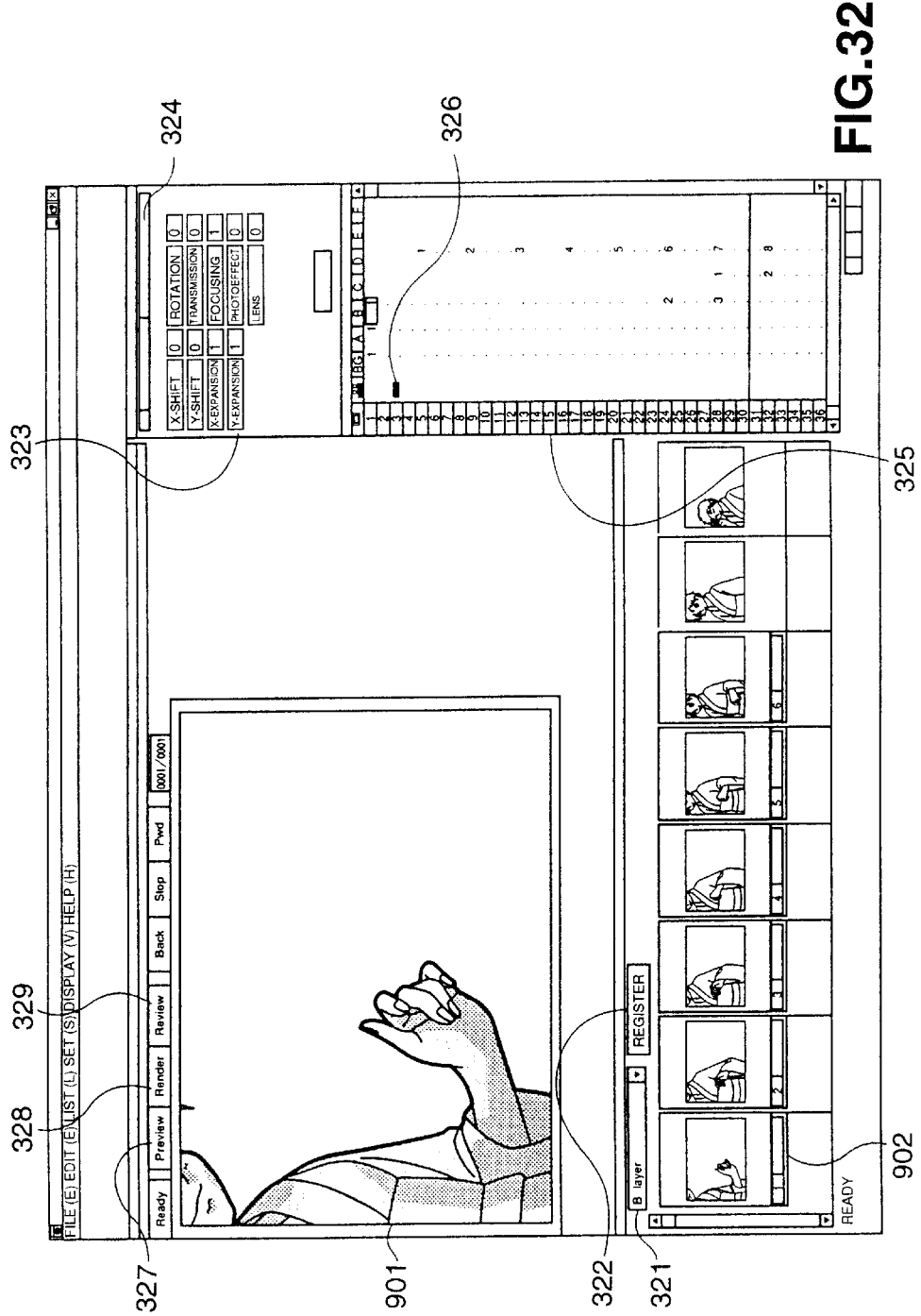
FIG. 32 shows an exemplary GUI for time sheet processing.

FIG. 32 shows an exemplary GUI in the case where time sheet processing described with reference to FIG. 3 is carried out. In this example, a layer is inputted and displayed in a display section 321. A button 322 is operated for registering a cell picture to the entry list. In a special effect setting window 323, in setting special effects for shifting or expanding a predetermined picture in the X-direction or in the Y-direction, or rotating the predetermined picture, the quantity of shift, expansion, or rotation can be set. In addition, transmission, focusing, photoeffect, and lens effect can also be set as special effects. In a display section 324, a layer on which special effects are to be set is designated and displayed.

In a time sheet display window 325, a time sheet is displayed. In this time sheet, the frame numbers are displayed in the longitudinal direction and the layer numbers are displayed in the lateral direction. Also, in this time sheet, a special effect setting display section is provided so that when a special effect is set, a mark 326 is displayed in the corresponding frame.

A button 327 is operated for carrying out preview operation. A button 328 is operated for preparing an AVI file (animation file). A button 329 is operated for carrying out review operation.

Figure 33:
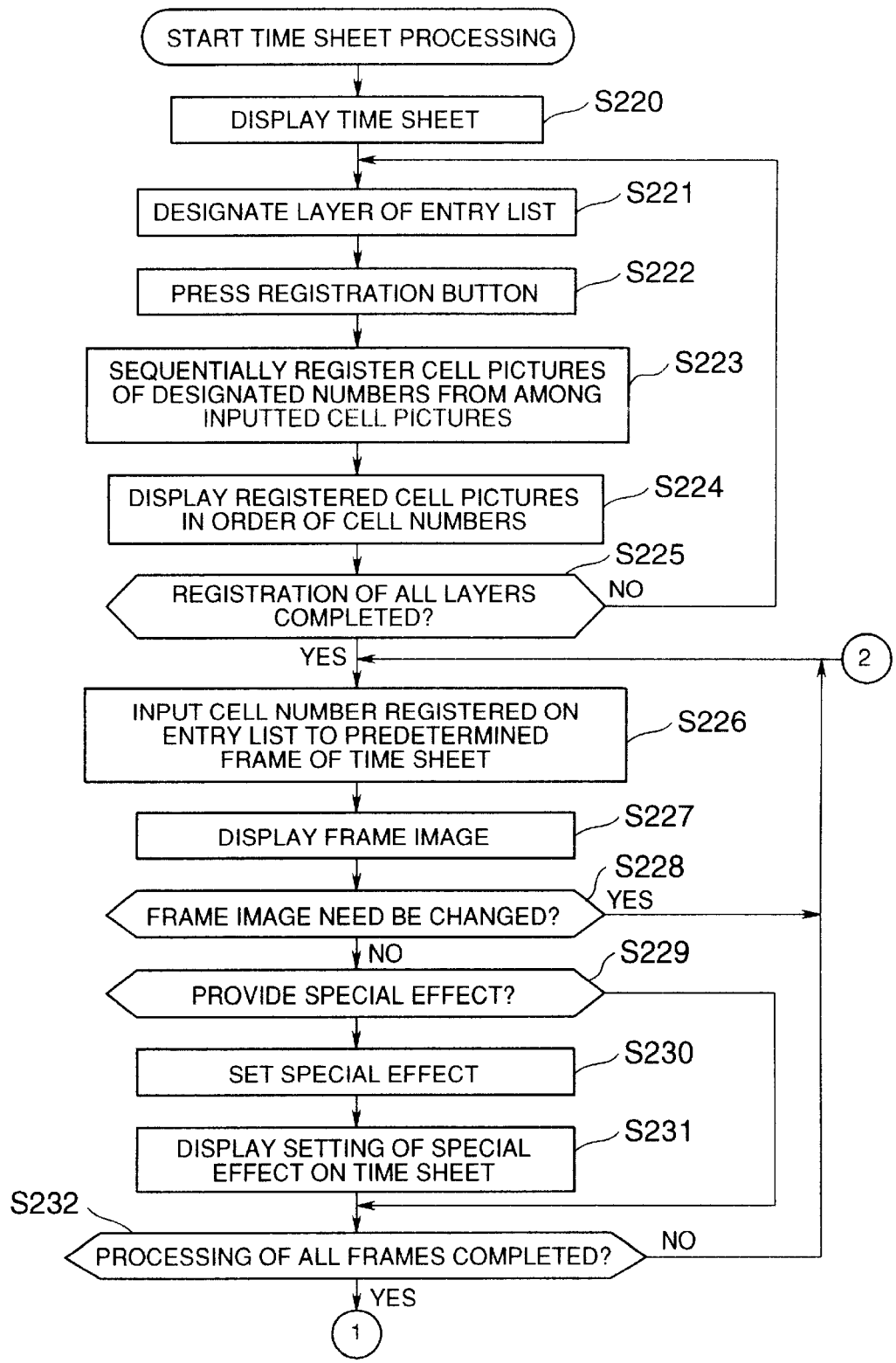
FIG. 33 is a flowchart for explaining time sheet processing.
Figure 34:
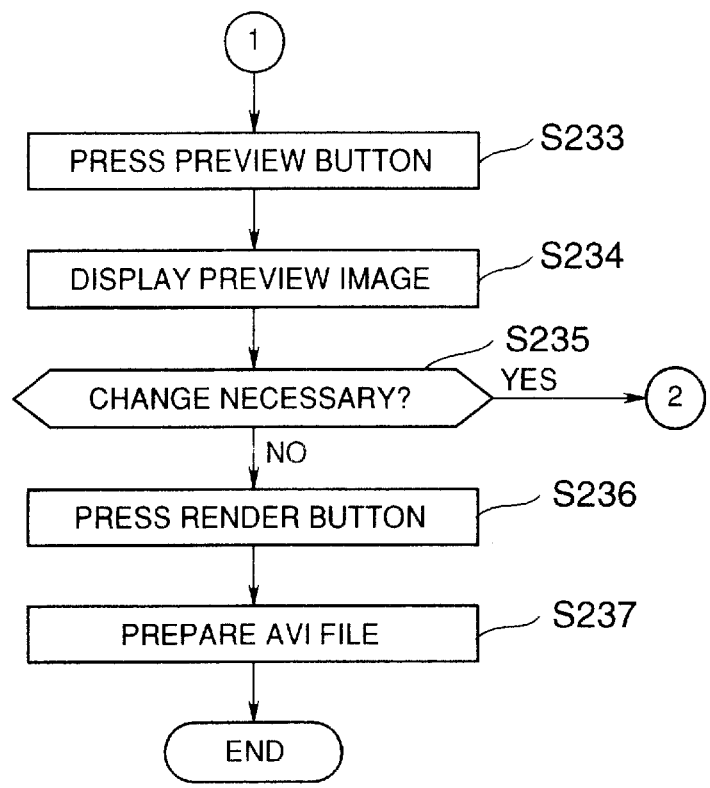
FIG. 34 is a flowchart for explaining time sheet processing.

Time sheet processing will now be described with reference the flowcharts of FIGS. 33 and 34. First, at step S220, the time sheet is displayed in the time sheet display window 325. Next, at step S221, the user designates and displays a layer to be registered on the entry list, in the display section 321. At step S222, the user operates the button 322 to display a necessary menu for registration of cell pictures on the entry list. At step S223, cell pictures of designated numbers from among the cell pictures taken in by the scanner 22 are sequentially registered on the entry list. At step S224, the registered cell pictures are sequentially displayed with their respective cell numbers appended thereto in the layer picture display window 902. At step S225, it is discriminated whether registration of all the necessary layers has been completed or not. If it is discriminated that there is a layer which has not been registered, the processing returns to step S221. Then, the layer is changed and similar processing is repeated.

If it is discriminated at step S225 that registration of all the layers has been completed, the processing goes to step S226, and the user inputs the cell numbers registered on the entry list into predetermined frames of the time sheet. In the example of FIG. 32, a cell picture of number 1 as the background is inputted in the frame 1. A cell picture of cell number 1 is inputted in the layer A, and the cell picture of number 1 is inputted in the layer B. When the cell number is inputted to a necessary number of layers in one frame, the frame picture is displayed in the picture display window 901 at step S227. From this picture, the user can confirm the frame picture obtained by synthesizing pictures of plural layers.

Next, the processing goes to step S228, where it is discriminated whether the frame picture is a desired picture or not. If it is discriminated that the frame picture needs to be changed, the processing returns to step S226 and the cell number on the time sheet is changed.

If it is discriminated at step S228 that a desired frame picture is obtained, the processing goes to step S229 and it is discriminated whether special effects need to be added or not. If special effects need to be added, the processing goes to step S230. Then, a desired cell number is inputted and displayed in the display section 324 of the special effect setting window 223, and values for special effects such as shift, expansion, and transmission are set. As this setting is carried out, the mark 326 indicating that special effects have been set is displayed on the time sheet at step S231.

If it is discriminated at step S229 that special effects need not be added, processing of steps S230 and S231 is skipped. Then, at step S232, it is discriminated whether input of all the frames to the time sheet has been completed or not. If it is discriminated that input of all the frames to the time sheet has not been completed, the processing returns to step S226 and the subsequent processing is repeated.

If it is discriminated at step S232 that input of all the frames to the time sheet has been completed, the processing goes to step S233 and the preview button 327 is pressed. At this point, at step S234, a dynamic image in conformity to the setting on the time sheet is tentatively displayed in the picture display window 901. Watching this preview image, the user at step S235 discriminates whether any change is needed or not. If it is discriminated that a change is needed, the processing returns to step S226 and the subsequent processing is repeated.

It is discriminated at step S235 that no change is needed, the processing goes to step S236 and the user presses the render button 328. At this point, at step S237, the pictures of plural frames prepared on the time sheet are prepared as an animation file and registered on the hard disk 13. When the review button 329 is operated, the data of the animation file thus produced is outputted to and displayed on an external monitor through the input/output interface 14.

Figure 35:
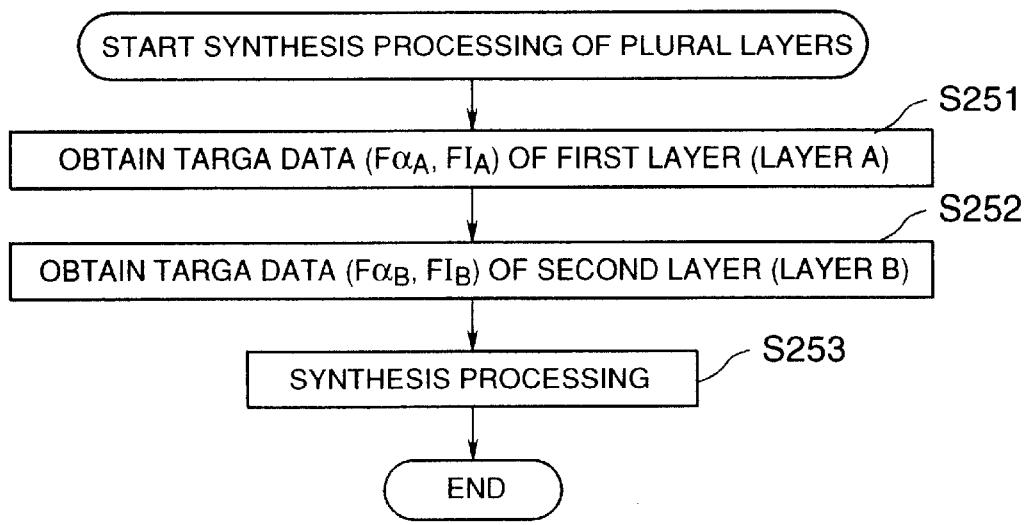
FIG. 35 is a flowchart for explaining synthesis processing of a plurality of layers.

Synthesis processing of painted pictures of plural layers will now be described. In the following example, pictures of two layers are synthesized for simplification. As shown in the flowchart of FIG. 35, at step S251, Targa data of a first layer (layer A) is obtained. This Targa data is constituted by final alpha key data $F\alpha_A$ and final image data $FI_A$, as described above.

Next, at step S252, Targa data of a second layer (layer B) is obtained. This Targa data, too, is synthesized from final alpha key data $F\alpha_B$ and final image data $FI_B$.

At step S253, synthesis processing is carried out. Specifically, on the assumption that a video signal outputted from the final alpha key data $F\alpha_A$ is represented by $V_{AOUT}$, $V_{AOUT}$ is expressed as follows, using an equation for synthesizing the final image data $FI_B$ to the final image data $FI_A$.

$$V_{AOUT} = F\alpha_A \cdot FI_A + (1 - F\alpha_A) \cdot F\alpha_B \cdot FI_B \tag{1}$$

Similarly, on the assumption that a video signal outputted from the final alpha key data $F\alpha_B$ is represented by $V_{BOUT}$, $V_{BOUT}$ is expressed as follows, using an equation for synthesizing the final image data $FI_A$ to the final image data $FI_B$.

$$V_{BOUT} = F\alpha_B + FI_B \cdot (1 - F\alpha_B) \cdot F\alpha_A \cdot FI_A \tag{2}$$

Next, it is assumed that priority data indicating the degree of priority put on the final image data $F_B$ with respect to the final image data $FI_A$ is represented by $P (0 \leq P \leq 1)$. When the layer B is located before the layer A, P=1 holds.

On the assumption that a video signal outputted as the image of the layer A in consideration of the priority data P is represented by $V'_{AOUT}$, the following equation can be obtained from equation (1).

$$\begin{aligned} V'_{AOUT} &= V_{AOUT} \cdot (1 - P) \\ &= \{F\alpha_A \cdot FI_A + (1 - F\alpha_A) \cdot F\alpha_B \cdot FI_B\}(1 - P) \end{aligned} \tag{3}$$

Similarly, on the assumption that a video signal outputted as the image of the layer B in consideration of the priority data P is represented by $V'_{BOUT}$, the following equation can be obtained from equation (2).

$$\begin{aligned} V'_{BOUT} &= V_{BOUT} \cdot P \\ &= \{F\alpha_B \cdot FI_B + (1 - F\alpha_B) \cdot F\alpha_A \cdot FI_A\} \cdot P \end{aligned} \tag{4}$$

On the assumption that a synthesized video signal obtained by synthesizing the layer A and the layer B is represented by $V_{OUT}$ and that its synthesis key signal is represented by $\alpha_{out}$, the following equation holds.

$$V_{OUT} \cdot \alpha_{OUT} = V'_{AOUT} + V'_{BOUT}$$

Thus, the following equation is obtained.

$$V_{OUT} = (V'_{AOUT} + V'_{BOUT}) / \alpha_{OUT} \tag{5}$$

When $\alpha_{OUT}$ is found, since the alpha key data is defined as the product of $(1-F\alpha_A)$ and $(1-F\alpha_B)$ in an area other than the areas where the final image data $FI_A$ and the final image data $FI_B$ are displayed, that is, in an area where neither the video signal $V_A$ nor the video signal $V_B$ is displayed, the alpha key data of the area where the final image data $FI_A$ or the final image data $FI_B$ is displayed is defined by the following formula.

$$1 - (1 - F\alpha_A) \cdot (1 - F\alpha_B)$$

Thus, the following equation is obtained.

$$\alpha_{OUT}=1-(131\ F\alpha A)\cdot(131\ F\alpha_B) \quad (6)$$

From the above-described equations (3) to (6), the following equation can be obtained.

$$V_{OUT}=[\{F\alpha_A\cdot FI_A+(1-F\alpha_A)\cdot F\alpha_B\cdot FI_B\}(1-P)+\{F\alpha_B\cdot FI_B+(1-F\alpha_B)\cdot F\alpha_A\cdot FI_A\}\cdot P]/\{1-(1-F\alpha_A)\cdot(1-F\alpha_B)\}$$

The priority data P is normally P=1. That is, the layer B is synthesized onto the layer A. By setting the value of P at a predetermined value from 0 to 1, the layer A can be seen perspectively through the layer B. The value of P can be set as a parameter in the "transmission" section of the special effect setting window 323 of FIG. 32.

As transmission media for transmitting a program for carrying out the foregoing processing to the user, communication media such as a network and a satellite as well as recording media such as a magnetic disk, a CD-ROM and a solid state memory can be used.

As described above, according to the image data processing device, the image data processing method and the transmission medium of the embodiment of the present invention, a picture constituted by a line is generated from a picture taken in, and a picture obtained by coloring pixels of an area surrounded by the line and the picture of the line are synthesized. Thus, a color picture can be quickly generated.

Also, according to the image data processing device, the image data processing method and the transmission medium of the embodiment of the present invention, the cell number and the layer number of a cell picture to be taken in are designated, and the cell number and the layer number of a cell picture which is already taken in are displayed. Thus, cell pictures drawn on the draft by the writer with a pencil or a pen can be taken in by the scanner or the like and converted to image data quickly and securely.

Also, according to the image data processing device, the image data processing method and the transmission medium of the embodiment of the present invention, a time sheet prescribed by the frame numbers and the layer numbers is displayed, and the cell number of the cell picture taken in is inputted at a predetermined position on the time sheet. Thus, each frame can be constituted or changed with an arbitrary cell number easily and securely.

Also, according to the image data processing device, the image data processing method and the transmission medium of the embodiment of the present invention, the density of a trace line is detected, and the color in the vicinity of the trace line of an area surrounded by the trace line is determined in accordance with the density. Thus, a tough intended by the writer can be accurately expressed.

Also, according to the image data processing device, the image data processing method and the transmission medium of the embodiment of the present invention, the color of a boundary portion between the trace line and the area surrounded by the trace line or the color of a boundary portion between an area on one side and an area on the other side of the trace line in the case where the trace line is omitted, is determined in accordance with the result of identification of the original color of the trace line. Thus, by setting the original color of the trace line to a predetermined color, the color of the boundary portion of the picture taken in can be determined to a desired color.

Also, according to the image data processing device, the image data processing method and the transmission medium of the embodiment of the present invention, a trace line taken in is expressed in a binary form and then converted to a line having a width of one pixel. Thus, generation of a non-painted portion left to be painted near the trace line can be prevented, and a color animation picture can be produced quickly and securely.

Also, according to the image data processing device, the image data processing method and the transmission medium of the embodiment of the present invention, it is confirmed whether a trace line is closed or not. Thus, a plurality of areas can be prevented from being colored with the same color, and each picture area can be colored with a desired color quickly and securely.

Also, according to the image data processing device, the image data processing method and the transmission medium of the embodiment of the present invention, a colored picture is displayed on an identification picture for identifying a colored area and an uncolored area of the colored picture. Thus, the uncolored picture can be quickly and securely confirmed so as to improve operability, and generation of a non-painted portion left to be painted can be prevented.

Also, according to the image data processing device, the image data processing method and the transmission medium of the embodiment of the present invention, the corresponding relation between a first picture of a first frame and a second picture of a second frame is discriminated, and the second picture is colored with the color of the first picture in accordance with the result of discrimination. Thus, coloring processing can be carried out quickly and securely.

In addition, according to the image data processing device, the image data processing method and the transmission medium of the embodiment of the present invention, colored pictures of a plurality of layers are synthesized in accordance with a parameter and key data. Thus, pictures full of variety can be generated easily and securely.

What is claimed is:

1. A method of producing animated image data, comprising the steps of:

generating a digital image by scanning an input line drawing;

thinning processing for thinning trace lines in said digital image to a width of one pixel on the basis of the color value of contacting pixels;

check processing said digital image to detect and correct for gaps in the pixels of the thinned trace lines, thereby ensuring that areas enclosed by the trace lines are closed for coloration;

painting processing for coloring areas in said digital image surrounded by the thinned trace lines;

line removal processing for setting the color value of the pixels in the trace lines to zero, thereby removing the trace lines from the digital image; and synthesis processing for setting the color value of the pixels in the removed trace lines on the basis of the colors in the areas on either side of the removed trace lines.

2. The method according to claim 1, further comprising the step of calculating lightness, chromaticity, and chroma data for said digital image.

3. The method according to claim 1, further comprising the step of filtering said digital image by setting flags associated with a pixel coloration in the image.

4. The method according to claim 3, further comprising the step of thickening processing for thickening trace lines in the filtered digital image to a width of three pixels on the basis of the color value of a trace line pixel.

5. The method according to claim 4, further comprising the step of trace line painting for coloring the thickened trace lines on the basis of the color value of said trace line pixel.

6. The method according to claim 1, further comprising the step of designating an area data in said digital image for coloring by said painting processing step.

7. The method according to claim 1, further comprising the step of retrieving corresponding area data from preceding digital images for coloring said digital image in said painting processing step.

8. The method according to claim 1, further comprising the step of alpha key processing to check that every pixel in an area is colored.

9. An image processing device for producing animated image data, comprising:

scanning means for generating a digital image by scanning an input line drawing;

thinning means for thinning trace lines in said digital image to a width of one pixel on the basis of the color value of contacting pixels;

checking means said digital image to detect and correct for gaps in the pixels of the thinned trace lines, thereby ensuring that areas enclosed by the trace lines are closed for coloration;

painting means for coloring areas in said digital image surrounded by the thinned trace lines;

line removal means for setting the color value of the pixels in the trace lines to zero, thereby removing the trace lines from the digital image; and synthesis means for setting the color value of the pixels in the removed trace lines on the basis of the colors in the areas on either side of the removed trace lines.

10. The image processing device according to claim 9, further comprising calculating means for calculating lightness, chromaticity, and chroma data for said digital image.

11. The image processing device according to claim 9, further comprising filtering means for filtering said digital image by setting flags associated with a pixel coloration in the image.

12. The image processing device according to claim 11, further comprising thickening means for thickening trace lines in the filtered digital image to a width of three pixels on the basis of the color value of a trace line pixel.

13. The image processing device according to claim 12, further comprising trace line painting means for coloring the thickened trace lines on the basis of the color value of said trace line pixel.

14. The image processing device according to claim 9, further comprising designating means for designating an area data in said digital image for coloring by said painting means.

15. The image processing device according to claim 9, further comprising retrieving means for retrieving corresponding area data from preceding digital images for coloring said digital image in said painting means.

16. The image processing device according to claim 9, further comprising alpha key processing means for checking that every pixel in an area is colored.

17. The image processing device according to claim 9, wherein each means has a graphical user interface (GUI) for performing the corresponding function.

* * * * *